United States Patent
Yatake

(10) Patent No.: US 11,390,769 B2
(45) Date of Patent: Jul. 19, 2022

(54) INK JET PRINTING METHOD, PRIMER INK COMPOSITION, AND INK JET INK COMPOSITION

(71) Applicant: Seiko Epson Corporation, Tokyo (JP)

(72) Inventor: Masahiro Yatake, Shiojiri (JP)

(73) Assignee: Seiko Epson Corporation

(*) Notice: Subject to any disclaimer, the term of this patent is extended or adjusted under 35 U.S.C. 154(b) by 59 days.

(21) Appl. No.: 16/884,126

(22) Filed: May 27, 2020

(65) Prior Publication Data

US 2020/0377750 A1     Dec. 3, 2020

(30) Foreign Application Priority Data

May 28, 2019   (JP) .............................. JP2019-099121

(51) Int. Cl.
*C09D 11/54* (2014.01)

(52) U.S. Cl.
CPC ..................................... *C09D 11/54* (2013.01)

(58) Field of Classification Search
CPC ........ C09D 11/40; C09D 11/54; C09D 11/322
See application file for complete search history.

(56) References Cited

FOREIGN PATENT DOCUMENTS

| JP | 2007-276387 A | * 10/2007 | ................ B41J 2/01 |
|---|---|---|---|
| JP | 2014-001378 A | 1/2014 | |
| JP | 2017-114934 A | 6/2017 | |
| JP | 2018-016662 A | 2/2018 | |

* cited by examiner

*Primary Examiner* — Khanh T Nguyen
(74) *Attorney, Agent, or Firm* — Harness, Dickey & Pierce, P.L.C.

(57) ABSTRACT

An ink jet printing method includes applying a primer ink composition containing cationic resin particles and water and an ink jet ink composition containing a dispersible anionic pigment, anionic resin particles, and water onto a printing medium such that a value Z defined by the following equation is in the range of 1.0 to 1.3:

$$Z=\{(Pa+Sa)\times Di\}/(Sc\times Dp),$$

wherein Sc represents the solid content of the cationic resin particles in the primer ink composition, represented by percentage to the total mass of the primer ink composition, Pa represents the solid content of the dispersible anionic pigment in the ink jet ink composition, represented by percentage to the total mass of the ink jet ink composition, Sa represents the solid content of the anionic resin particles in the ink jet ink composition, represented by percentage to the total mass of the ink jet ink composition, Dp represents the printing duty of the primer ink composition applied onto the printing medium, represented by percentage, and Di represents the printing duty of the ink jet ink composition applied onto the printing medium, represented by percentage.

7 Claims, No Drawings

INK JET PRINTING METHOD, PRIMER INK COMPOSITION, AND INK JET INK COMPOSITION

The present application is based on, and claims priority from JP Application Serial Number 2019-099121, filed May 28, 2019, the disclosure of which is hereby incorporated by reference herein in its entirety.

BACKGROUND

1. Technical Field

The present disclosure relates to an ink jet printing method, a primer ink composition, and an ink jet ink composition.

2. Related Art

There has been known flexible packaging printing for printing letters or characters, graphics, diagrams, or the like on non-absorbent printing media such as plastic films by gravure printing or offset printing. In such flexible packaging printing, plastic films made of polyethylene, polypropylene, polyethylene terephthalate, nylon, or the like are used as a non-absorbent printing medium.

Recently, there has been an attempt to apply an ink jet printing method to flexible packaging printing. For example, JP-2018-16662 discloses a recording (printing) liquid set including a recording (printing) ink containing a dispersible anionic pigment and a treatment liquid containing cationic resin particles. JP-2017-114934 discloses an ink set including a treatment liquid containing a cationic or nonionic resin having a polyurethane structure, a specific organic acid, and water and an ink jet recording (printing) ink containing a pigment. JP-2014-1378 discloses a water-based ink set for ink jet recording (printing) including a first ink containing a coloring material and a specific resin and a second ink containing a specific cationic polyurethane resin.

Unfortunately, it is difficult for the liquid set and the ink set disclosed in JP-2018-16662 and JP-2017-114934 to impart sufficient rub resistance to the ink applied onto non-absorbent printing media. Also, the ink set disclosed in JP-2014-1378 is difficult to use for increasing the printing speed because the first ink and the second ink require reacting with each other. An ink jet printing method capable of high-speed printing and forming ink coatings resistant to rubbing is desired.

SUMMARY

According to an aspect of the present disclosure, there is provided an ink jet printing method including applying a primer ink composition containing cationic resin particles and water and an ink jet ink composition containing a dispersible anionic pigment, anionic resin particles, and water onto a printing medium such that a value Z defined by the following formula is in the range of 1.0 to 1.3:

$$Z=\{(Pa+Sa) \times Di\}/(Sc \times Dp),$$

wherein Sc represents the solid content of the cationic resin particles in the primer ink composition, represented by percentage to the total mass of the primer ink composition, Pa represents the solid content of the dispersible anionic pigment in the ink jet ink composition, represented by percentage to the total mass of the ink jet ink composition; Sa represents the solid content of the anionic resin particles in the ink jet ink composition, represented by percentage to the total mass of the ink jet ink composition, Dp represents the printing duty of the primer ink composition applied onto the printing medium, represented by percentage, and Di represents the printing duty of the ink jet ink composition applied onto the printing medium, represented by percentage.

In the ink jet printing method, the printing medium may be a plastic film.

In the ink jet printing method, the anionic resin particles may contain at least one of urethane resin, acrylic resin, and styrene-acrylic resin.

In the ink jet printing method, the ink jet ink composition may be applied from an ink jet head onto the printing medium.

In the ink jet printing method, the primer ink composition may be applied from an ink jet head onto the printing medium.

According to another aspect of the present disclosure, a primer ink composition to be used in the above-described ink jet printing method is provided.

According to still another aspect of the present disclosure, an ink jet ink composition to be used in the above-described ink jet printing method is provided.

DESCRIPTION OF EXEMPLARY EMBODIMENTS

An embodiment of the present disclosure will now be described. The following embodiment will be described by way of example. The implementation of the subject matter of the present disclosure is not limited to the disclosed embodiment, and various modifications may be made within the scope and spirit of the disclosure. Not all of the components disclosed in the following embodiment are necessarily essential for the subject matter disclosed herein.

Exemplary Embodiment

In the following embodiment, a primer ink composition and an ink jet ink composition are applied onto a printing medium from an ink jet head mounted in an ink jet printing apparatus. In the following description, the primer ink composition may be simply referred to as the primer, and the ink jet ink composition may be simply referred to as the ink.

1. 1. Ink Jet Printing Apparatus

The ink jet printing apparatus used in the ink jet printing method of the embodiment disclosed herein may be, but is not limited to, a serial printer or a line head printer. Serial printers are of a type of printer provided with an ink jet head that is mounted on a carriage movable in a predetermined direction and is configured to perform printing while being moved with the movement of the carriage. Line head printers are of a type of printer provided with an ink jet head disposed long substantially across the width of the printing medium so that the heads can perform printing without moving.

The ink jet head provided for the ink jet printing apparatus is not particularly limited and may be of a type using piezoelectric elements, a type of using electromechanical conversion elements that cause electrostatic suction to deform a vibration plate acting as an actuator, or a type of using electrothermal conversion elements that cause the ink or the primer to be ejected in the form of droplets by air bubbles formed by heating.

The ink jet head has a plurality of nozzles so as to oppose the platen on which the printing medium is disposed. The ink jet head applies the ink and the primer onto the printing medium by ejecting the droplets of the ink and the primer through the nozzles. The ejection of the droplets is controlled according to desired printing data. Thus, a printed item including images, colors, letters or characters, patterns, diagrams, or the like printed on a printing medium is produced.

1. 2. Ink Jet Printing Method

The ink jet printing method disclosed herein uses a primer ink composition containing cationic resin particles and water and an ink jet ink composition containing a dispersible anionic pigment, anionic resin particles, and water. These ink compositions are applied onto a printing medium such that a value Z defined by the following equation (1) is in the range of 1.0 to 1.3:

$$Z=\{(Pa+Sa) \times Di\}/(Sc \times Dp) \quad (1)$$

wherein Sc represents the solid content of the cationic resin particles in the primer ink composition, represented by percentage to the total mass of the primer ink composition, Pa represents the solid content of the dispersible anionic pigment in the ink jet ink composition, represented by percentage to the total mass of the ink jet ink composition, Sa represents the solid content of the anionic resin particles in the ink jet ink composition, represented by percentage to the total mass of the ink jet ink composition, Dp represents the printing duty of the primer ink composition applied onto the printing medium, represented by percentage, and Di represents the printing duty of the ink jet ink composition applied onto the printing medium, represented by percentage.

The printing duty Di of the ink, mentioned herein is defined such that when a solid pattern is printed under the condition where an ink droplet of 28 ng±10% is applied onto a 1/600 inch×1/600 inch unit region, the printing duty is 100%. The printing duty Dp of the primer, mentioned herein is defined such that when a solid pattern is printed under the condition where a primer droplet of 28 ng±10% is applied onto a 1/600 inch×1/600 inch unit region, the printing duty is 100%.

In other words, the solid content Sc of the cationic resin particles in the primer and the printing duty Dp for printing the primer are controlled so that the value Z of equation (1) can be in the range of 1.0 to 1.3. In conjunction with such control, the solid content Pa of the dispersible anionic pigment and the solid content Sa of the anionic resin particles in the ink and the printing duty Di of the ink are controlled. The solid content Pa of the dispersible anionic pigment in the ink is calculated based on the total solid content of the pigment and the resin dispersant used to help the dispersion of the pigment. The resin dispersant will be described later herein.

When value Z is 1.0 or more, the dispersible anionic pigment and the anionic resin particles aggregate easily with the cationic resin particles on the printing medium. Consequently, the dispersible anionic pigment is likely to be surrounded by the anionic resin particles and the cationic resin particles. Such dispersible anionic pigment is unlikely to fall or separate from the printing medium, accordingly increasing resistance to rubbing (hereinafter often referred to as rub resistance). In addition, the gloss of the printed item produced by the ink jet printing method is increased. Furthermore, when the printed item is laminated, the peel strength between the printed item and the lamination material is enhanced.

When value Z is 1.3 or less, the proportion of the dispersible anionic pigment and the anionic resin particles to the cationic resin particles is not likely to be excessive and, therefore, the dispersible anionic pigment particles can aggregate reliably. Accordingly, even if a non-absorbent or poorly absorbent printing medium is printed at a higher speed than in the known printing method, color mixing and a coffee ring phenomenon can be suppressed. In general, a "coffee ring" is a pattern uneven in color density formed by evaporation of the vehicle in an ink. Such unevenness in color density is caused by a Marangoni flow inside a droplet on a surface resulting from varying surface tensions of the ink droplet, appearing a pattern that is dense at the periphery and is thin at the center.

In the ink jet printing method disclosed herein, the primer is first applied onto the printing medium, followed by applying the ink. The primer or the ink may be further applied after the application of the ink, provided that the primer is first applied onto the printing medium. Thus, the ink jet printing method can suppress bleeding of the ink when a plastic film is used as the printing medium.

In the embodiment disclosed herein, the primer is applied by being ejected from an ink jet head. The use of an ink jet head facilitates the grasp and the control of the mass or weight of the primer to be applied onto the printing medium. However, the application of the primer may be performed by roll coating, curtain coating, T die coating, or the like without limitation to using an ink jet head, provided that value Z defined by equation (1) is in the above-mentioned specific range.

1. 3. Printing Medium

The printing medium used in the ink jet printing method disclosed herein may be a poorly absorbent or non-absorbent printing medium. The poorly absorbent or non-absorbent printing medium mentioned herein refers to a printing medium that hardly absorbs or does not absorb ink. In at least some embodiments, the printing medium can absorb water at a rate of 10 mL/m² or less for a period of 30 ms$^{1/2}$ from the beginning of contact with water when measured by Bristow's method. Bristow's method is most broadly used for measuring liquid absorption in a short time, and Japan Technical Association of the Pulp and Paper Industry (JAPAN TAPPI) officially adopts this method. Details of this method are specified in Standard No. 51 (Paper and Paperboard—Liquid Absorption Test Method—Bristow's Method (in Japanese)) of JAPAN TAPPI Paper and Pulp Test Methods edited in 2000 (in Japanese). Such a poorly absorbent or non-absorbent printing medium may be a medium not provided with an ink-absorbent ink-receiving layer at the printing side thereof or a medium coated with a poorly ink-absorbent layer at the printing side thereof.

More specifically, the non-absorbent printing medium may be, but is not limited to, a plastic film not provided with an ink-receiving layer, or a paper sheet or any other base material coated or bonded to a plastic film. In the embodiment disclosed herein, a plastic film not provided with any ink-receiving layer is used as the non-absorbent printing medium. The plastic film not provided with any ink-receiving layer is hereinafter simply referred to as a plastic film.

The materials of the plastic film include polyvinyl chloride, polyethylene terephthalate, polycarbonate, polystyrene, polyurethane, polyethylene, and polypropylene. The ink jet printing method may be particularly effective in printing a plastic film containing mainly a polyolefin, such as polyethylene or polypropylene. Plastic films containing mainly a polyolefin are a type of printing media that is not suitable for adhesion. The embodiment disclosed herein can form images firmly fixed to such a printing medium and having a high rub resistance, thus being effective in printing plastic films. The plastic film may be surface-treated in advance with corona or plasma. Such surface treatment may make the ink coating applied onto the plastic film unlikely to separate from the plastic film.

The poorly absorbent printing medium may be, but is not limited to, coated paper including an ink-receiving layer at the surface thereof. The coated paper may be, but is not limited to, book-printing paper, such as art paper, coat paper, or matte paper.

The printing medium may be in the form of, but is not limited to, a roll, a bag, a sheet, or the like. The ink jet printing method disclosed herein can form desired images having a high fixability and a high rub resistance on non-absorbent or poorly absorbent printing media.

The printed side of the printed item produced by the ink jet printing method, that is, the printed side of the printing medium onto which the primer and the ink have been applied, may be laminated. Thus, the lamination coating can protect the printed side from direct contact, further enhancing the rub resistance of the printed side. The laminate printed side looks more uniform than the printed side of the unlaminated printed item. Thus, the lamination further enhances print quality.

For laminating the printed item, the lamination material may be stuck to the printed item with an adhesive containing urethane resin or the like. Thus, the printed item and the lamination material can be relatively firmly bonded together. Such a laminated printed item is not likely to separate into the lamination material and the printed item, thus being applicable to use in severe environments.

The primer ink composition and the ink jet ink composition used in an embodiment according to the present disclosure will now be described.

2. 1. Primer Ink Composition

The primer used in the embodiment disclosed herein contains cationic resin particles, water, a water-soluble organic solvent, a surfactant, and an organic acid. These constituents of the primer will now be described.

2. 1. 1. Cationic Resin Particles

The cationic resin particles may be soluble or dispersible in water.

The cationic resin particles may be applied onto the printing medium at a rate of 0.3 g/m$^2$ or more, for example, 1.5 g/m$^2$ or more. When the cationic resin particles are applied at such a rate, the ink jet printing method can produce advantageous effects. The upper limit of the application rate of the cationic resin particles may be, but is not limited to, 3.0 g/m$^2$ or less in view of the energy load of drying the printed item and cost. The application rate may be controlled by varying the solid content of the cationic resin particles in the primer and the printing duty of the primer.

The solid content of the cationic resin particles in the primer may be 5% to 50%, for example, 10% to 30%, relative to the total mass of the primer.

The average particle size of the cationic resin particles may be 10 nm to 300 nm, for example, 20 nm to 200 nm. Such a primer can further enhance the rub resistance of the printed item and suppress bleeding of the ink in the printed item. The term "average particle size" mentioned herein refers to the volume median diameter D50 of a particle size distribution. The average particle size is measured by dynamic light scattering or laser diffraction, which are specified in JIS 28825. More specifically, a particle size distribution analyzer using dynamic light scattering, for example, Microtrac UPA manufactured by Nikkiso, may be used. Alternatively, the average particle size may be measured by electrophoresis.

In some embodiments, self-emulsifiable and dispersible cationic resin particles may be used. A cationic component of the cationic resin particles may be, but is not limited to, a quaternary ammonium salt.

The cationic resin particles may have a glass transition temperature of about 20° C. or less from the viewpoint of adhesion with the printing medium such as plastic films. In some embodiments, the glass transition temperature of the cationic resin particle may be 0° C. or less.

The resin contained in the cationic resin particles may be an acrylic resin, a styrene-acrylic resin, or a urethane resin. The molecule of such a resin may have a functional group that helps the adhesion of the particles to the printing medium, such as a plastic film. Exemplary resins that can be used as the cationic resin particles will be cited below.

2. 1. 1. 1. Cationic Urethane Resin Particles

Cationic urethane resin particles may be produced from a polyol, a polyisocyanate, and a tertial amino group-containing polyol. In a process, for example, an isocyanate-terminated urethane prepolymer is produced by a reaction of a polyol, a polyisocyanate, and a separately prepared tertial amino group-containing polyol in a solvent or without using a solvent. Then, the chain of the urethane prepolymer is elongated with a polyamine, and, thus, a dispersion liquid of urethane resin particles is prepared. Subsequently, the tertial amino group of the urethane resin particles in the dispersion liquid is neutralized with an acid or converted into a quaternary group with a quaternizing agent. Thus, cationic urethane resin particles are produced.

In another process, for example, a polyurethane may be produced by a reaction of a polyol, a polyisocyanate, and a tertial amino group-containing polyol in a solvent or without using a solvent. Then, the tertial amino group of the polyurethane is neutralized with an acid or converted into a quaternary group with a quaternizing agent.

The tertial amino group-containing polyol can be prepared as described below. First, a compound having two epoxy groups in the molecule, which will be described later herein, and a secondary amine are mixed in a proportion of one equivalent of the NH group for one equivalent of the epoxy group. Subsequently, the mixture is subjected to a ring-opening addition reaction at 20° C. or with heating, and thus, the tertial amino group-containing polyol is produced.

Examples of the compound having two epoxy groups in the molecule include ethanediol 1,2-diglycidyl ether, propanediol 1,2-diglycidyl ether, propanediol 1,3-diglycidyl ether, butanediol 1,4-diglycidyl ether, pentanediol 1,5-diglycidyl ether, 3-methylpentadiol 1,5-diglycidyl ether, neopentyl glycol diglycidyl ether, hexanediol 1,6-diglycidyl ether, polybutadiene glycol diglycidyl ether, cyclohexanediol 1,4-diglycidyl ether, diglycidyl ether of 2,2-bis(4-hydroxycyclohexyl)propane (hydrogenated bisphenol A), and diglycidyl ether of a mixture of hydrogenated dihydroxydiphenylmethane isomers (hydrogenated bisphenol F).

For producing the cationic urethane resin particles, a silane coupling agent may be used. Examples of the silane coupling agent include γ-(2-aminoethyl)aminopropyltrimethoxysilane, γ-(2-hydroxyethyl)aminopropyltrimethoxysilane, γ-(2-aminoethyl)aminopropyltriethoxysilane, γ-(2-hydroxyethyl)aminopropyltriethoxysilane, γ-(2-aminoethyl)aminopropylmethyldimethoxysilane, γ-(2-aminoethyl)aminopropylmethyldiethoxysilane, γ-(2-hydroxyethyl)aminopropylmethyldimethoxysilane, γ-(2-hydroxyethyl)aminopropylmethyldiethoxysilane, γ-(N,N-di-2-hydroxylethyl)aminopropylethoxysilane, γ-aminopropyltrimethoxysilane, γ-aminopropylethoxysilane, γ-aminopropylmethyldimethoxysilane, γ-aminopropylmethyldiethoxysilane, γ-(N-phenyl)aminopropyltrimethoxysilane, γ-mercaptopropyltrimethoxysilane, and γ-mercaptophenyltrimethoxysilane.

The polyol, the polyisocyanate, and a chain elongating agent, such as polyamine or polyol, can be selected from the compounds used as those for producing anionic urethane resin particles described later herein.

The acid used to neutralize the tertial amino group in the dispersion liquid of the urethane resin particles or the tertial amino group in the polyurethane may be at least one selected from a group including aliphatic dicarboxylic or tricarboxylic acids, such as malonic acid, succinic acid, tartaric acid, oxalic acid, glutaric acid, adipic acid, pimelic acid, suberic acid, azelaic acid, sebacic acid, alkyl succinic acids, linolenic acid, maleic acid, fumaric acid, mesaconic acid, citraconic acid, itaconic acid, citric acid, and isocitric acid; aromatic carboxylic acids, such as phthalic acid, naphthalenedicarboxylic acid, biphenyldicarboxylic acid, and tetrahydrophthalic acid; organic sulfonic acids, sulfonic acid, p-toluenesulfonic acid, and methanesulfonic acid; and inorganic acids, such as phosphoric acid, boric acid, phosphorous acid, hydrochloric acid, sulfuric acid, and nitric acid.

The quaternizing agent to convert the tertial amino group in the dispersion liquid of urethane resin particles or the tertial amino group in the polyurethane into a quaternary amino group may be at least one selected from a group including dialkyl sulfates, such as dimethyl sulfate and diethyl sulfate; methyl alkylsulfonates or arylsulfonates, such as methyl methanesulfonate and methyl p-toluenesulfonate; epoxy compounds, such as ethylene oxide, propylene oxide, butylene oxide, styrene oxide, epichlorohydrin, allyl glycidyl ether, butyl glycidyl ether, 2-ethylhexyl glycidyl ether, and phenyl glycidyl ether; and alkyl halides, such as methyl chloride, ethyl chloride, benzyl chloride, methyl bromide, ethyl bromide, benzyl bromide, methyl iodide, ethyl iodide, and benzyl iodide.

2. 1. 1. 2. Cationic Acrylic or Styrene-Acrylic Resin Particles

In a process for producing cationic acrylic or styrene-acrylic resin particles, vinyl monomers, such as (meth)acrylic monomers, styrene, or α-methylstyrene are subjected to emulsion polymerization with a cationic emulsifier, emulsion polymerization using a polymer having a cationic group as a protective colloid, or inverse emulsion polymerization of a water-soluble cationic monomer. The (meth)acrylic monomers, styrene, and α-methylstyrene and radical polymerization initiators used for polymerization can be selected from the compounds used as those for producing the anionic acrylic or styrene-acrylic resin particles described later herein. The term (meth)acrylic (or (meth)acrylate) used herein refers to acrylic (or acrylate) and/or methacrylic (or methacrylate).

The cationic acrylic or styrene-acrylic resin particles may be produced from the above-cited materials by using a cationic surfactant as an emulsion stabilizer. Examples of the cationic surfactant include laurylamine salts, stearyltrimethylenediamine salts, octadecylamine salts, laurylpyridinium chloride, stearylammonium chloride, dioleylammonium chloride, and octylbenzyltrimethylammonium chloride.

In another process, the cationic acrylic or styrene-acrylic resin particles may be produced by emulsion polymerization of any of the above-cited materials with a nonionic surfactant, and subsequently adding a cationic material, such as a cationic surfactant, polyoxyethylene diamine, or polyethyleneimine.

Alternatively, the cationic acrylic or styrene-acrylic resin particles may be produced by radical copolymerization of an N-substituted aminoalkyl (meth)acrylate, such as dimethylaminoethyl (meth)acrylate or diethylaminoethyl (meth)acrylate, or an N-substituted aminoalkyl (meth)acrylamide, such as dimethylaminopropyl (meth)acrylamide, with another (meth)acrylic monomer, styrene, or α-methylstyrene, followed by quaternization with an alkylating agent.

In general, cationic acrylic or styrene-acrylic resin particles are produced from any of the above-cited materials by solution polymerization using a solvent or emulsion polymerization using an emulsifier. Examples of the alkylating agent used in such solution polymerization or emulsion polymerization include octyl chloride, octyl bromide, dodecyl chloride, dodecyl bromide, tetradecyl chloride, tetradecyl bromide, hexadecyl chloride, and hexadecyl bromide.

Cationic resin particles are commercially available. Examples of commercially available cationic resin particles include SUPERFLEX (registered trademark) series 620 and 650 produced by Dai-ichi Kogyo Seiyaku, PARASURF UP-22 produced by Ohara Paragium Chemical, PERMARIN (registered trademark) UC-20 produced by Sanyo Chemical Industries, ARROWBASE (registered trademark) series CB-1200 and CD-1200 produced by Unitika, and VINYBLAN (registered trademark) 2687 produced by Nissin Chemical Industry.

2. 1. 2. Water

Water is the major solvent of the primer used in the embodiment disclosed herein. The water is evaporated by drying after the primer has been applied onto the printing medium. The water may be pure water, such as ion exchanged water, ultrafiltered water, reverse osmosis water, or distilled water, or ultra-pure water from which ionic impurities have been removed as much as possible. The use of sterile water prepared by, for example, UV irradiation or addition of hydrogen peroxide can reduce the occurrence of mold or bacteria in the primer stored for a long time.

2. 1. 3. Water-Soluble Organic Solvent

The primer may contain a water-soluble organic solvent. The content of the water-soluble organic solvent, if added to the primer, may be less than 30%, for example, less than 25% or less than 20%, relative to the total mass of the primer.

Examples of the water-soluble organic solvent include monohydric or polyhydric alcohols; (poly)alkylene glycols; glycol ethers; nitrogen-containing polar solvents, for example, lactams, such as ε-caprolactam, 2-pyrrolidone, and N-methylpyrrolidone, and lactones, such as ε-caprolactone and δ-valerolactone; and sulfur-containing polar solvents, such as dimethyl sulfoxide (DMSO), acetin, and diacetin.

Polyhydric alcohols and lactams may be more beneficial as the water-soluble organic solvent. More specifically, examples of such a water-soluble organic solvent include 1,2-alkylene glycols, such as 1,2-hexanediol, 2-pyrrolidone, propylene glycol, butylethylpropanediol, 1,3-butandiol, 3-methoxy-3-methyl-1-butanol, 3-methoxy-1-butanol, 1-methoxy-2-propanol, 1-ethoxy-2-propanol, 1-butoxy-2-propanol, and triethylene glycol monobutyl ether. Such solvents may be used individually or in combination.

2. 1. 4. Surfactant

The primer may contain a surfactant. Surfactants help the primer or the ink to spread over and wet the printing medium such as a plastic film, thus promoting drying of the primer or the ink. Also, the primer containing a surfactant can be consistently ejected from the ink jet head.

The content of the surfactant, if added, may be 0.1% to 3.0%, for example, 0.3% to 1.0%, relative to the total mass of the primer. When the surfactant content is 0.1% by mass or more, the primer can be consistently ejected and can dry rapidly. Also, when the surfactant content is 3.0% by mass or less, a decrease in the drying speed of the primer can be suppressed.

A surfactant that may be used in the ink described later herein may be used. The primer may contain at least one of the surfactants described later herein.

2. 1. 5. Organic Acid

The primer may contain an organic acid. The organic acts to aggregate the dispersible anionic pigment particles in the ink. The primary dissociation constant of the organic acid may be 3.5 or less. Examples of such an organic acid include aliphatic dicarboxylic or tricarboxylic acids, such as malonic acid, succinic acid, tartaric acid, oxalic acid, glutaric acid, adipic acid, pimelic acid, suberic acid, azelaic acid, sebacic acid, alkyl succinic acids, linolenic acid, maleic acid, fumaric acid, mesaconic acid, citraconic acid, itaconic acid, citric acid, and isocitric acid; and alicyclic dicarboxylic acids, such as phthalic acid, naphthalenedicarboxylic acid, biphenyldicarboxylic acid, tetrahydrophthalic acid, and hydrogenated aromatic compounds.

Beneficially, an organic acid in a form not completely neutralized with a base is used. Complete neutralization implies that all the acid groups of the organic acid molecule bind ionically with a base. The organic acid having an acid group not bound to a base is miscible with the cationic components in the primer and therefore helps the primer to form a transparent primer coating or layer on the printing medium. Consequently, the image quality of the printed item can be improved compared to the case of using a multivalent metal salt or the like. In addition, the use of an organic acid allows the primer to be stably stored. Furthermore, the primer becomes unlikely to cause blocking of the printed sheets after drying. From the viewpoint of easily producing these effects, a polyvalent organic acid, such as malonic acid, malic acid, citric acid, or isocitric acid, may be used as the organic acid.

When the organic acid is added, the organic acid content is controlled so that the pH of the primer can be less than the primary dissociation constant of the organic acid. Such a primer can reduce the occurrence of bleeding when the ink is printed at a high speed.

2. 2. Preparation of the Primer

The primer may be prepared in, but not limited to, the following process. A dispersion of cationic resin particles and other constituents are mixed in any order. If necessary, the mixture may be filtered to remove impurities. For mixing the constituents, for example, the constituents may be added one after another into a container equipped with a stirring device, such as a mechanical stirrer or a magnetic stirrer, and the contents of the container are stirred.

2. 3. Physical Properties of the Primer

When the primer is applied onto a printing medium by ejection from an ink jet head, it is beneficial to control the physical properties of the primer. More specifically, to ensure uniform application onto the printing medium and consistent ejection from the ink jet head, the surface tension and the viscosity of the primer are controlled. For example, the surface tension at 20° C. of the primer may be controlled in the range of 20 mN/m to 40 mN/m or 20 mN/m to 35 mN/m. The surface tension can be determined by measuring the primer wetting a platinum plate at 20° C. with, for example, an automatic surface tensiometer CBVP-Z manufactured by Kyowa Interface Science.

Also, the viscosity of the primer at 20° C. may be controlled in the range of 1.0 mPa·s to 30.0 mPa·s or 1.5 mPa·s to 20 mPa·s. The viscosity of the primer at 20° C. can be measured with, for example, a viscoelasticity meter MCR-300 manufactured by Pysica at 20° C.

3. 1. Ink Jet Ink Composition

The ink jet ink composition used in the embodiment disclosed herein contains a dispersible anionic pigment, anionic resin particles, water, a water-soluble organic solvent, and a surfactant. These constituents of the ink will now be described.

3. 1. 1. Dispersible Anionic Pigment 3. 1. 1. 1. Pigment

The pigment used as a coloring material in the dispersible anionic pigment will now be described. On applying the ink onto a printing medium, the anionic resin particles cause the pigment to fix to the printing medium. By fixing the pigment to the printing medium, a printed item including an image, or the like is produced. By using a plurality of inks containing respective color pigments, color images are formed.

The pigment may be, but is not limited to, an inorganic pigment, such as carbon black, calcium carbonate, or titanium oxide, or an organic pigment, such as an azo pigment, an isoindolinone pigment, a diketopyrrolopyrrole pigment, a phthalocyanine pigment, a quinacridone pigment, or an anthraquinone pigment.

Exemplary black pigments include No. 2300, No. 900, MCF88, No. 33, No. 40, No. 45, No. 52, MA7, MA8, MA100, and No. 2200B, all produced by Mitsubishi Chemical; Raven series 5750, 5250, 5000, 3500, 1255, and 700, all produced by Columbia Carbon; Regal (registered trademark) series 400R, 330R, and 660R, Mogul (registered trademark) L, and Monarch (registered trademark) series 700, 800, 880, 900, 1000, 1100, 1300, and 1400, all produced by Cabot; and Color Blacks FW1, FW2, FW2V, FW18, FW200, 5150, 5160, and 5170, Printex (registered trademark) series 35, U, V, and 140U, and Special Blacks 6, 5, 4A, and 4, all produced by Degussa.

Exemplary white pigments include Color Index Generic Name (C.I.) Pigment Whites 1 (basic lead carbonate), (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (titanated mica), 21 (barium sulfate), 22 (natural barium sulfate), 23 (gloss white), 24 (alumina white), 25 (gypsum), 26 (magnesium oxide-silicon oxide), 27 (silica), and 28 (anhydrous calcium silicate). The compounds inside the individual sets of parentheses the compound names corresponding to the respective C.I. numbers.

Exemplary yellow pigments include C.I. Pigment Yellows 1, 2, 3, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Exemplary magenta pigments include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violets 19, 23, 32, 33, 36, 38, 43, and 50.

Exemplary cyan pigments include C.I. Pigment Blues 1, 2, 3, 15, 15:1, 15:2, 15:3, 15:34, 15:4, 16, 18, 22, 25, 60, 65, and 66 and C.I. Vat Blues 4 and 60.

Pigments other than black, white, yellow, magenta, and cyan pigments include C.I. Pigment Greens 7 and 10, C.I.

Pigment Browns 3, 5, 25, and 26, and C.I. Pigment Oranges 1, 2, 5, 7, 13, 14, 15, 16, 24, 34, 36, 38, 40, 43, and 63.

The above-cited pigments can be used as the dispersible anionic pigment. The dispersible anionic pigment is a self-dispersible anionic pigment, or a pigment dispersed in a medium with an anionic resin dispersant.

The self-dispersible anionic pigment is a mass of pigment particles having surfaces to which a functional group having an anionic group is bound directly or with another atomic group therebetween, or a mass of pigment particles to which an anionic resin dispersant is bound. The pigment whose particles have surfaces to which a functional group having an anionic group is bound may be referred to as a surface-treated pigment. The pigment to which an anionic resin dispersant is bound may be a pigment whose particles physically adsorb the anionic resin dispersant at the surfaces or a pigment whose particles are surrounded by the anionic resin dispersant. The anionic resin dispersant will be described later herein. In the following description, the anionic resin dispersant may be simply referred to as the resin dispersant.

Examples of the functional group having an anionic group include —COOM, —SO$_3$M, —PO$_3$HM, and —PO$_3$M$_2$, wherein M represents hydrogen, lithium, sodium, potassium, ammonium (NH$_4$), and or an organic amine, such as methyl amine, ethyl amine, monoethanolamine, diethanolamine, and triethanolamine. Examples of the atomic group indirectly binding the anionic group to the pigment surfaces include linear or branched alkylene groups having a carbon number of 1 to 12, a phenylene group, a naphthylene group, an amide group, a sulfonyl group, an amino group, a carbonyl group, an ester group, an ether group, and combined groups of two or more of these groups.

Such a self-dispersible pigment may be produced by binding an anionic group to the surfaces of the pigment particles by a known oxidation process, or by binding an anionic group to the surfaces of the pigment particles by, for example, diazo coupling. Either type may be used. The self-dispersible pigment is a pigment to which an anionic resin dispersant is bound at the surfaces of the particles thereof and may be prepared by binding a resin having an anionic group-containing unit as a hydrophilic unit to the surfaces of the pigment particles directly or with another atomic group therebetween.

If the printing medium is a transparent or translucent film, an undercoat layer may be formed of an inorganic white pigment to increase the fixability and the rub resistance of the ink. Also, such an undercoat layer makes the rear side of the printing medium difficult to see through, thus increasing the opacity of the printed item.

The pigments as described above may be used individually or in combination for one ink. The solid content of the pigment in the ink depends on the pigment used. In some embodiments, it may be 0.1% to 15.0%, for example, 1.0% to 10.0%, relative to the total mass of the ink from the viewpoint of achieving satisfactory color development.

The dispersible anionic pigment may be dispersed in a medium, and such a dispersion of the pigment may be added to the ink. A pigment dispersion may be prepared by dispersing a self-dispersible anionic pigment in a dispersion medium, such as water, or by dispersing a pigment in a dispersion medium with an anionic resin dispersant.

3. 1. 1. 2. Resin Dispersant

The resin dispersant used for dispersing a pigment in the ink will now be described. For dispersing a pigment, the resin dispersant may be used to be directly or indirectly bound to the surfaces of the pigment particles to prepare a self-dispersible pigment, used to be physically adsorbed onto the surfaces of the pigment particles, or used to surround the pigment particles. The resin dispersant content in the ink is not particularly limited, while the total solid content of the pigment, the resin dispersant, and the anionic resin particles may be 30% or less relative to the total mass of the ink.

The anionic resin as the anionic resin dispersant may be a copolymer containing an anionic group as a hydrophilic group and a hydrophobic group. The anionic group may be that of a hydrophilic monomer, such as (meth)acrylic acid or a salt thereof. The hydrophobic group may be a functional group of hydrophobic monomers, and such monomers include monomers having an aromatic ring, such as styrene and derivatives thereof and benzyl (meth)acrylate, and monomers having an aliphatic group, such as (meth)acrylic acid esters. The anionic resin used as the anionic resin dispersant may be a known resin that can be used in the ink jet ink composition.

The weight average molecular weight of the anionic resin may be 10000 to 100000, for example, 30000 to 80000. The anionic resin may have an acid value of 50 mg KOH/g to 150 mg KOH/g. Styrene-(meth)acrylic resin and (meth)acrylic resin have an acid value in such a range and are suitable as the anionic resin dispersant. When a resin dispersant is used, the mass ratio of the resin dispersant to the pigment may be controlled in the range of 0.1 to 10.0, for example, 0.5 to 5.0. The method for measuring the acid value will be described later herein.

3. 1. 2. Anionic Resin Particles

The material of the anionic resin particles may at least one of urethane resin, acrylic resin, and styrene-acrylic resin. Such a resin can increase the adhesion of the ink to the printing medium. The solid content of the anionic resin particles in the ink may be 30.0% or less relative to the total mass of the ink. The average particle size of the anionic resin particles may be 10 nm to 500 nm, for example, 20 nm to 150 nm. Such anionic resin particles can increase the storage stability of the ink. The average particle size of the anionic resin particles can be measured in the same manner as that of the cationic resin particles. Some examples of the anionic resin particles will now be described.

3. 1. 2. 1. Anionic Resin Particles Containing Urethane Resin

Polyurethane used as the urethane resin is polymerized by using polyisocyanate. More specifically, polyurethane is polymerized by using at least polyisocyanate and polyol and/or polyamine. For polymerizing a polyurethane, a polyol or a polyamine may be further used, if necessary, as a crosslinking agent or a chain elongating agent.

The polyurethane has at least one of the urethane bond (urethane group) formed by a reaction of an isocyanate group and a hydroxy group and the urea bond (urea group) formed by a reaction of an isocyanate group and an amino group. The molecular structure of the polyurethane may be linear or branched.

The polyurethane used herein may be thermoplastic regardless of the presence or absence of a cross-linked structure or may be in a cross-linked structure having no or substantially no glass transition temperature or melting point.

The isocyanate group to form a urethane bond is supplied from a compound having an isocyanate group. Also, the hydroxy group to form the urethane bond is supplied from a compound having a hydroxy group. For producing the polyurethane, the compound having an isocyanate group may have two or more isocyanate groups, and the compound having a hydroxy group may have two or more hydroxy groups.

In the description disclosed herein, the compound having two or more isocyanate groups may be referred to as polyisocyanate, and the compound having two or more hydroxy groups may be referred to as polyol. In particular, the compound having two isocyanate groups is often referred to as diisocyanate, and the compound having two hydroxy groups is often referred to as diol.

The molecular chain between isocyanate groups of the polyisocyanate, the molecular chain between hydroxy groups of the polyol, and the molecular chain between amino groups of the polyamine are not involved in the formation of the urethane bond or the urea bond of the polyurethane. In the description disclosed herein, the entirety or a part of the molecular structure, except the urethane bond or the urea bond, of the polyurethane may be referred to as the skeleton of the polyurethane. The skeleton may be linear or branched.

The polyurethane may have other bonds or linkages in addition to the urethane bond or the urea bond. Examples of such bonds or linkages include urea bonds formed by a reaction between a plurality of isocyanate bonds and water, a biuret bond formed by a reaction between a urea bond and an isocyanate group, an allophanate bond formed by a reaction between a urethane bond and an isocyanate group, an uretdione bond formed by dimerization of isocyanate groups, and an isocyanurate bond formed by trimerization of isocyanate groups.

The formation of such bonds may be promoted or inhibited by, for example, controlling the reaction temperature. Thus, a polyurethane having such a bond in addition to the urethane bond or the urea bond can be produced in a reaction system containing polyisocyanate, polyol, and polyamine together. When the polyurethane has an allophanate bond, a biuret bond, an uretdione bond, or an isocyanurate bond, the ink may exhibit a high adhesion to the printing medium and form strong coatings resistant to rubbing.

In the description disclosed herein, a compound having two or more amino groups may be referred to as a polyamine, as polyisocyanate and polyol are referred to as.

Next, the constituents of the anionic resin particles containing urethane resin will be described. Polyurethane used as urethane resin is a reaction product of a polyisocyanate and active hydrogen compound. Polyurethane is produced by copolymerization of at least a diisocyanate and a polyol. The anionic resin particles containing polyurethane, used in the embodiment disclosed herein may be produced by copolymerization of polyamine, and an optional polyol or polyamine as a crosslinking agent or a chain elongating agent.

The polyisocyanate may be a polyisocyanate monomer and/or a polyisocyanate derivative. Examples of the polyisocyanate monomer include aromatic polyisocyanate, alicyclic polyisocyanate, and aliphatic polyisocyanate.

Examples of the aromatic polyisocyanate include 2,4- and 2,6-tolylene diisocyanates (TDI's) and mixtures thereof, m- and p-phenylene diisocyanates and mixtures thereof, 4,4'-diphenyl diisocyanate, 1,5-naphthalene diisocyanate (NDI), 4,4'-, 2,4'-, and 2,2'-diphenyl methane diisocyanates (MDI's) and mixtures thereof, 4,4'-toluidine diisocyanate (TODI), 1,3- and 1,4-bis(isocyanatomethyl)benzene (XDI) and mixtures thereof, 1,3- and 1,4-bis(isocyanatopropyl) benzene (TMXDI) and mixtures thereof, and ω,ω'-diisocyanato-1,4-diethylbenzene.

Examples of the alicyclic polyisocyanate include 1,3-cyclopentane diisocyanate, 1,3-cyclopentene diisocyanate, 1,4-cyclohexane diisocyanate, 1,3-cyclohexane diisocyanate, isophorone diisocyanate (IPDI), 4,4'-, 2,4'-, and 2,2'-dicyclohexylmethane isocyanates, methyl-2,4-cyclohexane diisocyanate, methyl-2,6-cyclohexane diisocyanate, norbornane diisocyanate (NBDI) isomers and mixtures thereof, 1,3- and 1,4-bis(isocyanatomethyl)cyclohexanes(H6XDI's) and mixtures thereof.

Examples of the aliphatic polyisocyanate include ethylene diisocyanate, trimethylene diisocyanate, 1,2-propylene diisocyanate, tetramethylene diisocyanate, 1,2-butylene diisocyanate, 2,3-butylene diisocyanate, 1,3-butylene diisocyanate, 1,5-pentamethylene diisocyanate (PDI), and 1,6-hexamethylene diisocyanate (HDI).

Such polyisocyanate monomers may be used individually or in combination.

Examples of the polyisocyanate derivative include multimers, allophanate-modified forms, polyol-modified forms, biuret-modified forms, urea-modified forms, oxadiazine-modified forms, carbodiimide-modified forms, uretdione-modified forms, and uretonimine-modified forms of the above-cited polyisocyanate monomers. Polymethylene polyphenylene polyisocyanate (which is also referred to as polymeric MDI or crude MDI) may be used as the polyisocyanate derivative.

In some embodiments, the polyisocyanate monomer and/or the polyisocyanate derivative may be at least one selected from the group consisting of dicyclohexylmethane diisocyanate, isophorone diisocyanate, 1,3-bis(isocyanatomethyl)cyclohexane, 1,3-bis(isocyanatopropyl)benzene, and 1,3-bis(isocyanatomethyl)benzene.

The dicyclohexylmethane diisocyanate may be dicyclohexylmethane-4,4'-diisocyanate, dicyclohexylmethane-2,2'-diisocyanate, dicyclohexylmethane-2,4'-diisocyanate, or a mixture thereof. In an embodiment, the polyisocyanate may be a multifunctional polyisocyanate that is a dimer or higher multimer formed by any combination of the above-cited polyisocyanates. The multifunctional polyisocyanate has a structure including two or more polyisocyanate molecular units and, hence, has two or more isocyanate groups at the ends of the molecule thereof so as to react with the hydroxy group of polyol and/or the amino group of polyamine. Such a multifunctional polyisocyanate may have at least one bond selected from the group consisting of the allophanate bond, the uretdione bond, the isocyanurate bond, and the biuret bond.

The multifunctional polyisocyanate is a monomeric diisocyanate or a polymeric structure including two or more polyisocyanate molecules and may have many branches in the molecular structure. In a mass of a resin having a structure derived from a multifunctional polyisocyanate, the molecules of the resin are intricately intertwined three-dimensionally and in a state in which urethane bonds are dense. Therefore, the resin can be kept well dispersed in an aqueous ink in spite of having a low acid value. The use of a multifunctional polyisocyanate enhances the adhesion of the ink to the printing medium. An aqueous ink mentioned herein refers to an ink to which water is intentionally added as one of the constituents of the ink.

Also, the polyisocyanates as described above may increase the strength of the coating of the ink formed on the printing medium, accordingly increasing the rub resistance of the printed item. In particular, the use of an alicyclic polyisocyanate may further increase the strength of the coating, accordingly increasing rub resistance. The polyisocyanate may be a mixture of different polyisocyanates.

The polyisocyanate may have a structure including two or more polyisocyanate molecules. The structure including two or more polyisocyanate molecules may be the uretdione structure or the isocyanurate structure. Such a polyisocyanate forms a urethane having a structure in which the molecules are intricately intertwined three-dimensionally and in a state in which urethane bonds are dense. Therefore, the urethane resin can be kept well dispersed in an aqueous ink in spite of having a low acid value.

As described above, the polyurethane skeleton mentioned herein refers to the molecular chain between the functional groups of the polyurethane. The urethane resin used in the embodiment disclosed herein has a skeleton derived from the molecular chain of the material forming the urethane resin, such as polyisocyanate, polyol, or polyamine. In an embodiment, the skeleton may be, but is not limited to, a substituted or unsubstituted saturated, unsaturated, or aromatic chain. Such a molecular chain may have, for example, a carbonate bond, an ester bond, or an amide bond. In such a skeleton, the form and the number of the substituents are not particularly limited, and examples of the substituent include alkyl, hydroxy, carboxy, amino, sulfonyl, and phosphonyl.

The anionic resin particles containing such a urethane resin may be synthesized by using a polyol. The polyol is a bifunctional or higher functional compound, that is, a compound having two or more hydroxy groups and is not otherwise limited. The polyol may be an alkylene glycol, a polyester polyol, a polyether polyol, or a polycarbonate polyol.

Examples of the alkylene glycol include ethylene glycol, diethylene glycol, triethylene glycol, tetraethylene glycol, polyethylene glycol, 1,2-propylene glycol, 1,3-propanediol, tripropylene glycol, polypropylene glycol, polytetramethylene glycol, hexamethylene glycol, neopentyl glycol, 1,2-butanediol, 1,3-butanediol, 1,4-butanediol, 1,2-pentanediol, 1,5-pentanediol, 1,2-hexanediol, 1,6-hexanediol, 3-methyl-1,5-pentanediol, 1,2-cyclohexanediol, 1,4-cyclohexanediol, 1,4-cyclohexanedimethanol, 4,4-dihydroxyphenylpropane, 4,4-dihydrocyphenylmethane, glycerin, trimethylolethane, trimethylolpropane, 1,2,5-hexanetriol, 1,2,6-hexanetriol, pentaerythritol, trimethylol melamine, polyoxypropylene triol, dimethyl-1,3-pentanediol, diethyl-1,3-pentanediol, dipropyl-1,3-pentanediol, dibutyl-1,3-pentanediol, and 2-butyl-2-ethyl-1,3-propanediol.

In a process using an alkylene glycol as a polyol, the alkylene glycol, which has a low molecular weight, enters the three-dimensional network structure formed in the polyurethane and react with the isocyanate to form the urethane bond. Thus, a still more stronger ink coating may be formed. Consequently, the strength of the ink coating may increase to enhance the rub resistance of the resulting printed item.

The polyester polyol may be an acid ester. Acids that can form the acid ester include aliphatic dicarboxylic or tricarboxylic acids, such as malonic acid, succinic acid, tartaric acid, oxalic acid, glutaric acid, adipic acid, pimelic acid, suberic acid, azelaic acid, sebacic acid, alkyl succinic acids, linolenic acid, maleic acid, fumaric acid, mesaconic acid, citraconic acid, itaconic acid, citric acid, and isocitric acid; and alicyclic dicarboxylic acids, such as phthalic acid, naphthalenedicarboxylic acid, biphenyldicarboxylic acid, tetrahydrophthalic acid, and hydrogenated aromatic compounds. An anhydride, a salt, an alkyl ester, an acid halide of such an acid may be used as the acid component of the acid ester. The alcohol that can form the acid ester may be, but is not limited to, any of the above-cited alkylene glycols.

The polyether polyol may be an addition polymer of an alkylene oxide or a condensation polymer of polyols, such as polyalkylene glycols. Examples of the alkylene oxide include ethylene oxide, propylene oxide, butylene oxide, and α-olefin oxide. Examples of the polyalkylene glycols include polyethylene glycol (or polyoxyethylene), polypropylene glycol (or polyoxypropylene), and polybutylene glycol. In particular, polypropylene glycol enhances the flexibility of the polyurethane, and the coating formed by printing on a plastic film exhibits increased rub resistance and gloss. A commercially available polypropylene glycol may be used. Examples thereof include EXCENOL (registered trademark) series produced by AGC, NEWPOL (registered trademark) PP produced by Sanyo Chemical, and UNIOL (registered trademark) D series produced by NOF.

Polycarbonate diol has a molecular chain having two hydroxy groups and a carbonate bond. Polycarbonate diol, which may be used as a portion or the entirety of the polyol, can be produced by a reaction of a carbonate, such as an alkylene carbonate, a diaryl carbonate, or a dialkyl carbonate, with phosgene and an aliphatic polyol. Alternatively, an alkanediol-based polycarbonate diol, such as poly(hexamethylene carbonate) diol, may be used. The polycarbonate diol used for synthesizing the polyurethane tends to increase the resistance of the resulting polyurethane to heat and hydrolysis.

By using a polycarbonate diol as the polyol, the resulting polyurethane has a skeleton derived from the polycarbonate diol. Such a skeleton enhances the rub resistance of the resulting printed item.

Polycarbonate diols generally have two hydroxy groups in the molecule thereof and can be produced by a transesterification reaction of a diol and a carbonic acid ester. Examples of the diol used for the transesterification reaction include 1,4-butanediol, 1,3-butanediol, 1,2-butanediol, 1,5-pentanedioil, 1,2-pentanediol, 1,6-hexanediol, 1,5-hexanediol, 1,2-hexanediol, 1,7-heptanediol, 1,8-octanediol, 1,2-octanediol, 1,9-nonanediol, 1,10-decanediol, neopentyl glycol, 4-methyl-1,5-pentanediol, 2-methyl-1,3-propanediol, 2-methyl-1,8-octanediol, 2-isopropyl-1,4-butanediol, 2-ethyl-1,6-hexanediol, 3-methyl-1,5-pentanediol, 2,4-dimethyl-1,5-pentanediol, 2,4-diethyl-1,5-pentanediol, 2-ethyl-1,3-hexanediol, 2-butyl-2-ethyl-1,3-propanediol, 1,4-cyclohexane dimethanol, 1,3-cyclohexanediol, and 1,4-cyclohexanediol. Such diols may be used individually or in combination.

Beneficially, neopentyl glycol, 4-methyl-1,5-pentanediol, 2-methyl-1,3-propanediol, 2-methyl-1,8-octanediol, 2-isopropyl-1,4-butanediol, 2-ethyl-1,6-hexanediol, 3-methyl-1, 5-pentanediol, 2,4-dimethyl-1,5-pentanediol, or 2,4-diethyl-1,5-pentanediol may be used because these diols are unlikely to crystalize.

The carbonic acid ester used for synthesizing the polycarbonate diol is not limited provided that the ink enables favorable printing on plastic films and may be a dialkyl carbonate, a diaryl carbonate, or an alkylene carbonate. In some embodiments, a diaryl carbonate may be used in view of reactivity. Examples of the carbonic acid ester include dimethyl carbonate, diethyl carbonate, dibutyl carbonate, diphenyl carbonate, and ethylene carbonate. In some embodiments, diphenyl carbonate may be selected.

The polycarbonate diol is commercially available. Examples of commercially available polycarbonate diols include Mitsubishi Chemical BENEBiOL (registered trademark) series: NL1010DB, NL2010DB, NL3010DB, NL1010B, NL2010B, NL3010B, NL1050DB, NL2050DB, and NL3050DB; Asahi Kasei DURANOL (registered trademark) series; Tosoh NIPPOLAN (registered trademark) series; Kuraray Poly Hexanediol Carbonate; Daicel PLACCEL (registered trademark) CDCD205PL; and Ube Industries ETERNACOLL (registered trademark) series.

In some embodiments, the polyol used as one of the materials of the polyurethane may have an acid group in the molecule. Acid group-containing diols used as such a polyol include dimethylolacetic acid, dimethylolpropionic acid, dimethylolbutanoic acid, and dimethylolbutyric acid. In some embodiments, dimethylolpropionic acid or dimethylolbutanoic acid may be selected. Since the ink used in the embodiment disclosed herein is aqueous, the polyurethane may be polymerized by using such an acid group-containing diol as one of the materials.

For synthesizing a polyurethane from a polypropylene glycol and/or a polycarbonate diol, the weight average molecular weight thereof may be 500 to 3000. Polypropylene glycols and polycarbonate diols having a weight average molecular weight of 500 or more do not excessively increase the urethane bond density of the resulting polyurethane, and the molecular chain derived from the polypropylene glycol and/or the polycarbonate diol is not likely to become rigid. Accordingly, the flexibility of the resulting polyurethane is increased to enhance the rub resistance of the ink coating, and hence the rub resistance of the printed item.

Also, polypropylene glycols and polycarbonate diols having a weight average molecular weight of 3000 or less do not excessively reduce the urethane bond density of the resulting polyurethane, and the molecular chain derived from the polypropylene glycol and/or the polycarbonate diol is not excessively elongated. Accordingly, tackiness is reduced, and a rub resistance is ensured.

Thus, when the polypropylene glycol and/or the polycarbonate diol have a weight average molecular weight of 500 to 3000, the ink coating formed of the anionic resin particles containing urethane resin, or the polyurethane, exhibits a favorable balance between the strength and the flexibility. Thus, the resulting printed item has a satisfactory rub resistance.

The molecule of the polyurethane synthesized by using such materials includes two segments: a hard segment and a soft segment. The hard segment is defined by a crosslinked structure or molecular chain formed of a polyisocyanate, a short-chain polyol, a polyamine, and a crosslinking agent or chain elongating agent and is mainly involved in the strength of the polyurethane. The soft segment is formed of a long-chain polyol and is mainly involved in the flexibility of the polyurethane. In the polyurethane coating formed by applying the ink onto a printing medium, such hard segments and soft segments form a microphase-separated structure that can impart both a strength and a flexibility and, thus, a high elasticity to the coating. These properties of the coating lead to an increased rub resistance of the printed item.

The materials of the polyurethane may include a polyamine. The polyamine is a compound having two or more amino groups and is not otherwise limited.

Examples of the polyamine include aliphatic diamines, such as ethylenediamine, propylenediamine, 2,2-dimethyl-1,3-propanediamine, 2-methyl-1,5-pentanediamine, trimethylhexanediamine, 2-butyl-2-ethyl-1,5-pentanediamine, 1,8-octanediamine, 1,9-nonanediamine, and 1,10-decanediamine, diethylenetriamine, hexylenediamine, triethylenetetramine, tetraethylenepentamine, isophorone diamine, xylylenediamine, diphenylmethanediamine, hydrogenated diphenylmethanediamine, hydrazine, polyamide polyamine, polyethylene polyimine, 1-amino-3-aminomethyl-3,5,5-trimethylcyclohexane, dicyclohexylmethanediamine, bicycloheptanedimethaneamine, mensendiamine, diaminodicyclohexylmethane, isopropylidene cyclohexyl-4,4'-diamine, 1,4-diaminocyclohexane, and 1,3-bisaminomethylcyclohexane.

Many of the compounds used as polyamine in various fields have approximately the same molecular weight as short-chain polyols. The polyamine in the polyurethane basically forms the urea group or biuret group that is the hard segment of the polyurethane. The polyurethane containing the urea group may be called urea resin.

The polyamine may be used as a component to react with a multifunctional polyisocyanate, a chain elongating agent, or a crosslinking agent. The reaction of the amino group with the isocyanate group forms a urea bond. If a polyamine is used, the amount thereof may be adjusted so that the polyurethane can have a predetermined urea group/urethane group ratio, thus controlling the physical properties of the polyurethane.

In a process for synthesizing the polyurethane, at least either a crosslinking agent or a chain elongating agent may be used. The crosslinking agent is used for synthesizing a prepolymer, and the chain elongating agent is used for elongating the prepolymer chain. The crosslinking agent and the chain elongating agent are selected from among the above-cited polyisocyanates, polyols, and polyamines, depending on the use thereof.

The chain elongating agent is, for example, a compound to react with isocyanate groups of the polyisocyanate not forming the urethane bond. The chain elongating agent may be selected from the above-cited polyols and polyamines. The chain elongating agent may be a compound capable of forming crosslinks in the polyurethane. Examples of the chain elongating agent may be a low-molecular weight polyol or polyamine having a number average molecular weight of less than 500.

The crosslinking agent may be a trifunctional or higher functional polyisocyanate, polyol, or polyamine. Examples of the trifunctional or higher functional polyisocyanate include polyisocyanates having an isocyanurate bond and polyisocyanates having an allophanate or biuret bond. Examples of the trifunctional or higher functional polyol include glycerin, trimethylolpropane, pentaerythritol, and polyoxypropylene triol. Examples of the trifunctional or higher functional polyamine include trialcoholamines, such as triethanolamine and triisopropanolamine, and amines having three or more amino groups, such as diethylenetriamine and tetraethylenepentamine.

Whether or not the polyurethane has a crosslinked structure can be determined based on the gel fraction defined by the ratio of gel to sol under a phenomenon in which crosslinked polyurethane swells without dissolving in a solvent. The term gel fraction is a measure of the degree of crosslinking of polyurethane, measured based on the solubility of cured polyurethane. In general, the higher the degree of crosslinking, the higher the gel fraction.

The process for synthesizing the anionic resin particles containing urethane resin will now be described. The anionic resin particles containing polyurethane or urethane resin can be produced by a known process. An exemplary process will be described below.

A polyisocyanate and at least one compound capable of reacting with the polyisocyanate (for example, a polyol and, optionally, a polyamine or the like) are caused to react in such a proportion that isocyanate groups account for a higher proportion, thus synthesizing a prepolymer having isocyanate groups at the ends of the molecule. In this reaction, an organic solvent, such as methyl ethyl ketone, acetone, or tetrahydrofuran, having a boiling point of 100° C. or less and having no groups capable of reacting with the isocyanate group may be used if necessary. Such a reaction is generally called a prepolymer process.

If an acid group-containing diol is used as one of the materials of the polyurethane, the acid group of the prepolymer is neutralized by using a compound capable of acting as a counter ion to the acid group. Such a compound may be an organic base, such as N,N-dimethylethanolamine, N,N-diethylethanolamine, diethanolamine, triethanolamine, triisopropanolamine, trimethylamine, or triethylamine, or an inorganic base, such as sodium hydroxide, potassium hydroxide, or ammonia. In some embodiments, a neutralizer containing an alkali metal, such as sodium hydroxide or potassium hydroxide, is used. Thus, the polyurethane can be kept well dispersed. The amount of the neutralizer may be 0.5 mol to 1.0 mol, for example, 0.8 mol to 1.0 mol, for 1 mol of the acid group of the prepolymer. In this instance, the viscosity of the reaction system is unlikely to increase. This is favorable in workability.

Next, the prepolymer is added into a liquid containing a chain elongating agent or a crosslinking agent for a chain elongating reaction or a crosslinking reaction. Subsequently, the organic solvent or medium, if used, is removed to yield anionic polyurethane resin particles. For removal of the organic solvent or medium, an evaporator or the like is used.

In the polymerization reaction for synthesizing the polyurethane, a catalyst is used. Examples of the catalyst include titanium catalysts, aluminum catalysts, zirconium catalysts, antimony catalysts, germanium catalysts, bismuth catalysts, and metal complex-based catalysts. Exemplary titanium catalysts include tetraalkyl titanates, such as tetrabutyl titanate and tetramethyl titanate, and oxalic acid metal salts, such as titanium potassium oxalate.

Other known catalysts may be used without particular limitation, and examples thereof include tin compounds, such as dibutyltin oxide and dibutyltin dilaurylate. A non-heavy metal catalyst may be used. In particular, it has long been known that acetylacetonate complexes of transition metals, such as titanium, iron, copper, zirconium, nickel, cobalt, and manganese, are active in urethanation. In view of increasing environmental awareness, catalysts that can be substituted for heavy metal catalysts are demanded. In particular, the high urethanation activity of titanium/zirconium compounds is increasingly being used. The use of plastic films for food packaging accounts for a large percentage of the applications of plastic films in the flexible packaging field. Therefore, heavy metal catalysts are likely to be replaced.

The urethane resin of the anionic resin particles may have an acid value of 5 mg KOH/g to 200 mg KOH/g. In some embodiments, the acid value may be 7 mg KOH/g to 100 mg KOH/g or 8 mg KO/g to 50 mg KOH/g. Anionic resin particles containing a urethane resin having an acid value of 5 mg KOH/g or more can be kept well dispersed in the ink, and such an ink is unlikely to cause clogging even at high temperature. Also, when the acid value of the urethane resin is 200 mg KOH/g or less, the anionic resin particles are not likely to swell with water, and accordingly, the viscosity of the ink does not much increase. In addition, the resulting printed item can keep the water resistance high.

The acid value of the urethane resin can be measured by potentiometric colloid titration. For example, the acid value is determined by measurement with a titrator AT610 manufactured by Kyoto Electronics and calculation using the following equation. The titrant may be a sodium hydroxide solution in ethanol.

Acid value (mg/g)=(EP1−BL1)×FA1×C1×K1/SIZE In the equation, EP1 represents the volume (mL) of titrant added, BL1 represents the blank value (0.0 mL), the FA1 represents the factor (1.00) of the titrant, C1 represents a concentration conversion factor (5.611 mg/mL) equivalent to 1 mL of 0.1 mol/L potassium hydroxide (KOH), K1 represents a coefficient (1), and SIZE represents the weight (g) of analyte.

The acid value of the urethane can be adjusted by, for example, varying the content of the skeleton derived from a carboxy-containing glycol. The carboxy-containing glycol may be the acid group-containing polyol, such as, dimethylolpropionic acid. In the ink of the embodiment disclosed herein, the polyurethane of the anionic resin particles is a carboxy-containing polyurethane produced by using a carboxy-containing glycol from the viewpoint of easy dispersion of the anionic resin particles.

In an embodiment, the ink may contain particles of two or more different resins including urethane resin and urea resin (polyurea). The urethane resin before being added to the ink may be in the form of an emulsion.

The anionic resin particles containing urethane resin is commercially available. Such commercially available products include polyether-based urethane resin dispersion in water, polyester-based urethane resin dispersion in water, and polycarbonate-based urethane resin dispersion in water.

Examples of the polyether-based urethane resin dispersion in water include EVAFANOL (registered trademark) HA-15 produced by Nicca Chemical, SUPERFLEX (registered trademark) 130 produced by Dai-ichi Kogyo Seiyaku, and HYDRAN (registered trademark) series WLS-201 and 312B produced by DIC.

3. 1. 2. 2. Anionic Resin Particles Containing Acrylic or Styrene-Acrylic Resin

The materials used for synthesizing the acrylic or styrene-acrylic resin include, but are not limited to, acrylic monomers or oligomers, styrene monomers, or the like and, in addition, a radical polymerization initiator, a polymerization regulator, such as a chain transfer agent or a pH adjuster, and a dispersion medium.

The materials of the anionic resin particles containing acrylic or styrene-acrylic resin will now be described. The monomers that can be used in the synthesis of the acrylic or styrene-acrylic resin include (meth)acrylic acid alkyl esters, such as methyl (meth)acrylate, ethyl (meth)acrylate, n-butyl (meth)acrylate, isobutyl (meth)acrylate, tert-butyl (meth) acrylate, n-propyl (meth)acrylate, n-hexyl (meth)acrylate, 2-ethylhexyl (meth)acrylate, n-octyl (meth)acrylate, isooctyl acrylate, isodecyl (meth)acrylate, lauryl (meth)acrylate, cetyl (meth)acrylate, stearyl (meth)acrylate, and isostearyl (meth)acrylate; and alicyclic (meth)acrylic acid esters, such as cyclohexyl (meth)acrylate and isobornyl (meth)acrylate. Such monomers may be used individually or in combination.

For selecting a (meth)acrylic acid alkyl ester, the alkyl group thereof may have a carbon number of 1 to 20, for example, 1 to 12 or 1 to 8. In some embodiments, methyl methacrylate or n-butyl acrylate may be selected. In particular, the use of methyl methacrylate enhances the resistance to ethanol and water of the ink coating of the printed item.

Alternatively, the monomer may be selected from among hydroxyalkyl (meth)acrylates, such as hydroxyethyl (meth) acrylate and hydroxypropyl (meth)acrylate, and hydroxy-containing ethylenically unsaturated monomers, such as polyethylene glycol (meth)acrylate and other polyalkylene glycol (meth)acrylates. Beneficially, the monomer is selected from among hydroxyalkyl (meth)acrylates containing a hydroxyalkyl group having a carbon number of 2 to 4 and polyalkylene glycol (meth)acrylates containing an alkylene group having a carbon number of 2 to 4. In some embodiments, hydroxyethyl (meth)acrylate may be used.

Also, the monomer may be at least one selected from among glycidyl (meth)acrylate, allyl glycidyl ether, and methylglycidyl (meth)acrylate. Beneficial examples of the monomers used for synthesis of the acrylic or styrene-acrylic resin include epoxy-containing ethylenically unsaturated monomers, such as glycidyl (meth)acrylate; methylol-containing ethylenically unsaturated monomers, such as N-methylol(meth)acrylamide and dimethylol(meth)acrylamide; N-methoxymethyl(meth)acrylamide and N-butoxymethyl(meth)acrylamide; alkoxyalkyl (meth)acrylates, such as methoxyethyl (meth)acrylate, methoxypropyl (meth)acrylate, ethoxyethyl (meth)acrylate, and ethoxypropyl (meth)acrylate; alkoxyalkyl-containing ethylenically unsaturated monomers, such as polyethylene glycol monomethoxy (meth)acrylate and other polyalkylene glycol monoalkoxy (meth)acrylates; cyano-containing ethylenically unsaturated monomers, such as (meth)acrylonitrile; di(meth)acrylates, such as divinylbenzene, polyoxyethylene di(meth)acrylate, polyoxypropylene di(meth)acrylate, neopentyl glycol di(meth)acrylate, and butanediol di(meth)acrylate; tri(meth)acrylates, such as trimethylolpropane tri(meth)acrylate; ethylenically unsaturated monomers having two or more radically polymerizable double bonds, such as pentaerythritol tetra(meth)acrylate and other tetra(meth)acrylates; amino-containing ethylenically unsaturated monomers, such as N,N-dimethylaminomethyl (meth)acrylate and N,N-diethylaminoethyl (meth)acrylate; and aromatic ring-containing ethylenically unsaturated monomers, such as styrene, α-methylstyrene, benzyl (meth)acrylate, and phenoxyethyl (meth)acrylate.

From the viewpoint of sufficiently dispersing the acrylic or styrene-acrylic resin in water, an acid group-containing monomer is added as a monomer in the polymerization of the resin. The acid group-containing monomer is a carboxy-containing monomer, such as (meth)acrylic acid. Methacrylic acid is more beneficial.

Examples of the polymerization initiator include organic peroxides, such as alkyl peroxides, t-butyl hydroperoxide, cumene hydroperoxide, p-methane hydroperoxide, lauroyl peroxide, 3,5,5-trimethylhexanoyl peroxide, octanoyl peroxide, t-butyl cumyl peroxide, benzoyl peroxide, dichlorobenzoyl peroxide, dicumyl peroxide, di-t-butyl peroxide, 1,1-bis(t-butylperoxy)-3,3,5-trimethylcyclohexane, 3,3,5-trimethylcyclohexanone peroxide, methylcyclohexanone peroxide, diisobutyl peroxydicarbonate, di-2-ethylhexyl peroxydicarbonate, and t-butyl peroxyisobutyrate; and 2,2'-azobisisobutyronitrile, dimethyl-2,2'-azobisisobutyrate, 2,2'-azobis(2,4-dimethylvaleronitrile), 2,2'-asobis(2-methylbutyronitrile), potassium persulfate, sodium persulfate, ammonium persulfate, hydrogen peroxide, 4,4'-azobis-4-cyanovaleric acid ammonium (amine) salt, 2,2'-azobis(2-methylamidoxime) dihydrochloride, 2,2'-azobis(2-methylbutaneamidoxime) dihydrochloride tetrahydrate, 2,2'-azobis{2-methyl-N-[1,1-bis(hydroxymethyl)-2-hydroxyethyl]propionamide}, and 2,2'-azobis[2-methyl-N-(2-hydroxyethyl)propionamide].

Such polymerization initiators may be used individually or in combination. Potassium persulfate and sodium persulfate are superior in terms of polymerization stability and, therefore, may be beneficially used.

The polymerization initiator may be used in a proportion of 0.01 part to 5.00 parts, for example, 0.02 part to 3.00 parts or 0.03 part to 1.00 part, relative to the total mass (100 parts) of the monomers. When the polymerization initiator is used in such a range, the monomers can be polymerized at a certain speed and form a resin having a higher molecular weight, thus increasing the water resistance of the resulting resin.

The polymerization initiator may be previously contained in the polymerization reaction system or may be added immediately before starting the polymerization. Also, an additional amount of the polymerization initiator may be added during polymerization if necessary. Alternatively, the polymerization initiator may be mixed with the monomer material in advance or added into an emulsion containing the monomer material. Before being added or mixed, the polymerization initiator may be dissolved in a solvent or the monomer material, and, furthermore, the solution of the polymerization initiator may be emulsified.

The polymerization regulator may be, for example, a chain transfer agent or a pH adjuster. Examples of the chain transfer agent include mercaptans, such as n-dodecyl mercaptan, thioglycolic acid, octyl thioglycolate, and thioglycerol; alcohols, such as methanol, ethanol, propanol, and butanol; and aldehydes, such as acetaldehyde, propionaldehyde, n-butyl aldehyde, furfural, and benzaldehyde. Such compounds may be used individually or in combination. In some embodiments, the chain transfer agent may be selected from mercaptans.

The chain transfer agent helps stabilize polymerization but may reduce the polymerization degree of the acrylic or styrene-acrylic resin. Accordingly, the chain transfer agent may be used in a proportion of 0.01 part to 1.00 part, for example, 0.01 part to 0.50 part, relative to the total mass (100 parts) of the monomers. The chain transfer agent used in a proportion in such a range can function satisfactorily as a polymerization regulator, and the resulting resin can be flexible appropriately but not excessively and facilitates consistent ejection of the ink from an ink jet head to reduce the occurrence of clogging.

Examples of the pH adjuster include metal hydroxides, such as sodium hydroxide, potassium hydroxide, and lithium hydroxide; amines, such as triethylamine, trimethylamine, diethylethanolamine, triethanolamine, and triisopropanolamine; and salts having a buffer action, such as sodium acetate, ammonium acetate, sodium formate, ammonium formate, sodium carbonate, sodium hydrogencarbonate, potassium hydrogencarbonate, monosodium phosphate, monopotassium phosphate, disodium phosphate, and trisodium phosphate. Such pH adjusters may be used individually or in combination.

The pH adjuster may be used in a proportion of 0.01 part to 10.00 parts, for example, 0.10 part to 5.00 parts, relative to the total mass (100 parts) of the monomers. The pH adjuster used in such a proportion can function satisfactorily as a polymerization regulator, and the polymerization is not likely to be inhibited.

The dispersion medium may be aqueous. The aqueous medium may be water, a water-based medium containing an alcoholic solvent. In some embodiment, the aqueous medium is water.

A process for synthesizing the anionic resin particles containing acrylic or styrene-acrylic resin will now be described. In some embodiments, emulsion polymerization is employed for this synthesis, or polymerization. For the emulsion polymerization, monomers, a radical polymerization initiator, a polymerization regulator, a dispersion medium, and an emulsifier are mixed. The mixture is stirred to emulsify, and the resulting monomer emulsion is heated for polymerization. In some embodiments, for the polymerization, a part of the monomer emulsion may be gradually added to the rest of the monomer emulsion. The emulsion polymerization is performed at a temperature of, for example, 40° C. to 95° C. (beneficially 65° C. to 85° C.) over a period of 0.5 hour to 6.0 hours. At this time, such polymerization may be conducted for the entire amount of the monomer emulsion at one time, or one or more parts of the monomer emulsion may be added to the other. For the emulsion polymerization, the compounds of the monomers or the dropping speed may be varied, or the monomer emulsion may be dropped step by step for a multi-step polymerization reaction.

The acrylic or styrene-acrylic resin of the anionic resin particles may have an acid value in the same range as the acid value of the above-described urethane resin. By controlling the acid value, the acrylic or styrene-acrylic resin can produce the same effects as the urethane resin. The acid value of the acrylic or styrene-acrylic resin can be measured in the same manner as that of the urethane resin.

The anionic resin particles containing acrylic or styrene-acrylic resin are commercially available. Examples thereof include styrene-acrylic resin emulsion produced by BASF, such as JONCRYL (registered trademark) series 7100, PDX-7370, and PDX-7341; styrene-acrylic resin emulsion produced by DIC, such as VONCOAT (registered trademark) series EC-905EF, 5400EF, and CG-8400; acrylic resin emulsion produced by Nippon Synthetic Chemical Industry, such as MOWINYL (registered trademark) series 966A, 6963, and 6960; and styrene-acrylic resin emulsion produced by Nippon Synthetic Chemical Industry, such as MOWINYL (registered trademark) series 6969D and RA-033A4.

The resin particles contained in the ink used in the embodiment disclosed herein may further include resin particles containing any other resin in addition to the resin particles containing polyurethane resin or the resin particles containing acrylic or styrene-acrylic resin. A plurality of types of resin particles may be used in combination as such other resin particles.

The total solid content of the resin particles in the ink may be, by mass, 0.1% to 6.0%, for example, 1.0% to 5.0%.

3. 1. 3. Water

Water is the major solvent of the ink used in the embodiment disclosed herein. The water is evaporated by drying after the ink has been applied onto the printing medium. The ink used in the embodiment disclosed herein is an aqueous ink containing water. Aqueous ink allows resin particles to be dispersed to form an emulsion, thus providing an ink that can fix firmly to the printing medium, leading to an increased rub resistance. The water may be the same as described for the primer.

The water content is controlled so that the total content of other constituents including the pigment, the resin dispersant, the resin particles, the water-soluble organic solvent, and the surfactant can be 50% or more relative to the total mass of the ink. Hence, the water content is less than 50% by mass.

3. 1. 4. Water-Soluble Organic Solvent

By adding a water-soluble organic solvent to the ink, the ink can be consistently ejected by an ink jet printing method. Also, the water-soluble organic solvent suppresses water evaporation from the ink jet head during long-time storage of the ink jet printing apparatus, thus reducing clogging. The water-soluble organic solvent content is controlled so that the total content of the pigment, the resin dispersant, the resin particles, and the water-soluble organic solvent can be 50% or less relative to the total mass of the ink.

The water-soluble organic solvent may be the same as described for the primer. In some embodiments, the water-soluble organic solvent in the ink may be 1,2-hexanediol, propylene glycol, or 2-pyrrolidone. Such a water-soluble organic solvent helps the ink retain water, thus preventing the ink from drying in the ink jet head or the like.

The water-soluble organic solvent content may be 40% or less, beneficially 0.5% to 20%, relative to the total mass of the ink.

3. 1. 5. Surfactant

By adding a water-soluble organic solvent and a surfactant to the ink, the ink applied onto a non-absorbent printing medium such as a plastic film can spread favorably over the surface of the printing medium and dry rapidly. Accordingly, high-speed printing becomes possible.

The surfactant may be at least one selected from among nonionic surfactants, anionic surfactants, cationic surfactants, and amphoteric surfactants. Nonionic surfactants are beneficial, and, in some embodiments, an acetylene glycol-based surfactant or a silicone surfactant may be used as a nonionic surfactant. The ink containing such a surfactant can spread favorably over the surface of the printing medium and dry rapidly. Also, such an ink can be consistently ejected from the ink jet head.

The total surfactant content may be 0.01% to 3.00% relative to the total mass of the ink. In some embodiments, the surfactant content may be, by mass, 0.05% to 2.00%, for example, 0.10% to 1.00% or 0.20% to 0.50%.

3. 1. 6. Other Constituents

The ink may further contain other constituents, such as a chelating agent, a preservative, a pH adjuster, and other additives capable of preserving the ink and keeping the ink stable.

Chelating agents capture metal ions. The chelating agent in the ink captures impurity metal ions that may be originally contained in the ink or may be contaminants produced when the ink comes in contact with a member of the head, thus reducing foreign matter derived from the metal ions. Examples of the chelating agent include ethylenediaminetetraacetic acid (EDTA) salts, ethylenediamine nitrilotriacetates, hexametaphosphates, pyrophosphates, and metaphosphates.

Use of a preservative reduces the growth of mold and bacteria to help preserve the ink in good condition. The preservative is commercially available, and examples thereof include Proxel (registered trademark) series CRL, BDN, GXL, XL-2, IB, and TN produced by Lonza.

The pH adjuster in the ink reduces impurities leached from the ink flow channel members of the ink jet printing apparatus and suppresses corrosion of the ink-repellent film or the like of the ink jet head. Examples of the pH adjuster include morpholine compounds, piperazine compounds, and amino alcohols, such as triethanolamine.

The ink used in the embodiment disclosed herein may further contain a water-soluble organic compound that is solid at room temperature, such as urea, ethyleneurea, or any other urea derivative. Furthermore, the ink may optionally contain other additives, such as a corrosion inhibitor, an antifungal agent, an antioxidant, an antireductant, an evaporation promoter, and a water-soluble resin.

3. 2. Preparation of the Ink

The ink may be prepared in, but not limited to, the following process. A dispersion of a dispersible anionic pigment, an emulsion, or a dispersion, of anionic resin particles, and other constituents of the ink are mixed in any order. If necessary, the mixture may be filtered to remove impurities. For mixing the constituents, for example, the constituents may be added one after another into a container equipped with a stirring device, such as a mechanical stirrer or a magnetic stirrer, and the contents of the container are stirred.

3. 3. Physical Properties of the Ink

The physical properties of the ink may be controlled as described below. To ensure uniform application onto the printing medium and consistent ejection from the ink jet head, the surface tension and the viscosity of the ink are controlled. More specifically, the surface tension at 20° C. of the ink may be controlled in the range of 20 mN/m to 40 mN/m, for example, 22 mN/m to 33 mN/m. The surface tension of the ink can be measured in the same manner as that of the primer.

Also, the viscosity of the ink at 20° C. may be controlled in the range of 1.0 mPa·s to 30.0 mPa·s, for example, 1.5 mPa·s to 20 mPa·s. The viscosity of the ink at 20° C. can be measured in the same manner as that of the primer.

As described herein above, the ink jet printing method, the primer ink composition, and the ink jet ink composition produce the following effects.

The embodiments of the present disclosure can increase the rub resistance of the ink coating on non-absorbent printing media and printing speed compared to the known art. More specifically, when value Z is 1.0 or more, the dispersible anionic pigment and the anionic resin particles in the ink aggregate easily with the anionic resin particles in the primer on the printing medium. Consequently, the dispersible anionic pigment is likely to be surrounded by the anionic resin particles and the cationic resin particles. Such dispersible anionic pigment is unlikely to fall or separate from the printing medium, accordingly increasing the rub resistance of the ink coating on the printing medium, and hence the rub resistance of the printed item.

When value Z is 1.3 or less, the proportion of the dispersible anionic pigment and the anionic resin particles to the cationic resin particles is not likely to be excessive and, therefore, the dispersible anionic pigment particles can aggregate reliably. Consequently, the ink can dry rapidly on the printing medium. Accordingly, even if a non-absorbent or poorly absorbent printing medium is printed at a higher speed than in the known printing method, color mixing and a coffee ring phenomenon can be suppressed. Thus, the embodiments according to the present disclosure can provide an ink jet printing method capable of high-speed printing and forming ink coatings having a high resistance to rubbing.

The ink and the primer on a plastic film are more likely than those on an absorbent printing medium to uniformly form aggregates. Accordingly, the ink is not likely to form a coating in which aggregates of the dispersible anionic pigment particles are unevenly distributed, and the ink coating on the printing medium has high rub resistance.

Since the anionic resin particles contain at least one of urethane resin, acrylic resin, and styrene-acrylic resin, the ink exhibits high adhesion to the printing medium. Accordingly, the rub resistance of the ink coating on the printing medium is increased. In addition, the gloss of the printed item produced by the ink jet printing method is increased.

In the ink jet printing method, since the ink and the primer are applied onto a printing medium by using an ink jet head, the amounts of the ink and the primer to be applied onto the printing medium can be easily controlled. Accordingly, the printing duties Dp and Di in equation (1) are easy to control.

Also, the ejection of droplets of the ink and the primer is less likely to become inconsistent in either case of intermittent ejection or long-time continuous ejection. Thus, the consistency of printing is improved.

Furthermore, when the printed item is laminated, the peel strength between the printed item and the lamination material is increased.

Examples and Comparative Examples

The concept of the present disclosure will be further described in detail with reference to Examples and Comparative Examples. However, the implementation of the concept is not limited to the Examples, and various modifications may be made unless departing from the scope and spirit of the present disclosure. In the following description, "%" and "part(s)" are on a mass basis unless otherwise specified.

4. 1. Preparation of Anionic Resin Particles

Emulsions of some anionic resins were prepared as the dispersion of anionic resin particles.

4. 1. 1. Urethane Resin Emulsion A-1

Urethane resin emulsion A-1 was prepared as a dispersion of anionic resin particles. A reaction vessel equipped with a stirrer, a reflux condenser, and a thermometer was charged with 1500 parts of a polycarbonate diol NIPPOLAN (registered trademark) 964 (produced by Tosoh Corporation, number average molecular weight: 2000), 220 parts of 2,2-dimethylolpropionic acid (DMPA), and 1347 parts of methyl ethyl ketone (boiling point: 79.64° C.) in an atmosphere of flowing nitrogen, and the vessel was heated to 60° C. to dissolve the DMPA. Furthermore, 1300 parts of dicyclohexylmethane 4,4'-diisocyanate (MCHDI) and 2.6 parts of a urethanation catalyst XK-614 (produced by Kusumoto Chemicals) were added. The resulting mixture was heated to 90° C. and subjected a urethanation reaction over a period of 5 hours. Thus, an isocyanate-terminated urethane prepolymer was produced.

The isocyanate-terminated urethane prepolymer was cooled to 80° C., and to which 220 parts of triethanolamine was added. Then, 4340 parts of the mixture was added into a mixed solution of 5400 parts of ion-exchanged water and 22 parts of triethanolamine with strong stirring. Subsequently, 1500 parts of ice and, then, 1084 parts of 35% bicycloheptanedimethaneamine (BCHDMA) aqueous solution were added for a chain elongating reaction. Subsequently, the solvent and water were partially removed to a solid content of 30% by evaporation to yield polycarbonate-based anionic urethane resin emulsion A-1. The resulting urethane resin emulsion A-1 contained 30% of urethane resin component and 64% of water and had an acid value of 18 mg KOH/g.

4. 1. 2. Urethane Resin Emulsion A-2

Polycarbonate-based anionic urethane resin emulsion A-2 was prepared in the same manner as in the preparation of urethane resin emulsion A-1, except that 1300 parts of dicyclohexylmethane 4,4'-diisocyanate (MCHDI) was replaced with 1100 parts of isophorone diisocyanate (IPDI). The resulting urethane resin emulsion A-2 contained 30% of urethane resin component and 64% of water and had an acid value of 18 mg KOH/g).

4. 1. 3. Urethane Resin Emulsion A-3

Polycarbonate-based anionic urethane resin emulsion A-3 was prepared in the same manner as in the preparation of urethane resin emulsion A-1, except that 1300 parts of dicyclohexylmethane 4,4'-diisocyanate (MCHDI) was replaced with 950 parts of 1,3-bis(isocyanatomethyl)cyclohexane (BIMCH). The resulting urethane resin emulsion A-3 contained 30% of urethane resin component and 64% of water and had an acid value of 18 mg KOH/g).

4. 1. 4. Urethane Resin Emulsion A-4

Polycarbonate-based anionic urethane resin emulsion A-4 was prepared in the same manner as in the preparation of urethane resin emulsion A-1, except that 1300 parts of dicyclohexylmethane 4,4'-diisocyanate (MCHDI) was replaced with 2000 parts of polyisocyanate BURNOCK DN992-S (produced by DIC). The resulting urethane resin emulsion A-4 contained 30% of urethane resin component and 64% of water and had an acid value of 18 mg KOH/g.

4. 1. 5. Acrylic Resin Emulsion B-1

Anionic acrylic resin emulsion B-1 was prepared as the dispersion of anionic resin particles. More specifically, monomers consisting of 700 parts of methyl acrylate (MA), 100 parts of hydroxyethyl acrylate (HEA), and 50 parts of butyl acrylate (BA) were added into the solution of 35 parts of emulsifier (nonionic surfactant EMULGEN (registered trademark) 1118-70 produced by Kao) in 400 parts of ion-exchanged water, and the mixture was stirred to yield an emulsion of the monomer composition. Then, a reaction vessel equipped with a stirrer, a thermometer, a cooler, and a nitrogen gas-delivering device was charged with 173 parts of ion-exchanged water and 1 part of a non-reactive anionic surfactant Emulsogen (registered trademark) EPA073 (produced by Clariant) in an atmosphere of flowing nitrogen, followed by stirring. The resulting solution was heated to 80° C. Into the solution, a 10% aliquot of the emulsion of the monomer composition and 13 parts of 3% potassium persulfate solution were added for polymerization. Then, 53 parts of 3% potassium persulfate and the rest (90% aliquot) of the emulsion of the monomer composition were dropped over a period of 3 hours and 30 minutes to cause the polymerization reaction to proceed at a temperature kept 80° C. After dropping, the reaction was conducted for 80 minutes.

Furthermore, 9 parts of 3% potassium persulfate and monomers consisting of 24 parts of methyl acrylate (MA) and 48 parts of methacrylic acid (MAA) were simultaneously added into the reaction vessel to start polymerization. After adjusting the pH of the reaction mixture to pH 7.5 with 10% sodium hydroxide aqueous solution, the reaction mixture was aged for 3 hours by the reaction. Then, the reaction system was cooled to about 20° C., and into which 5 parts of a preservative Proxel (registered trademark) XL-2 was added to yield anionic acrylic resin emulsion B-1. The resulting acrylic resin emulsion B-1 contained 30% of solids having an average particle size of 80 nm and had an acid value of 28 mg KOH/g and a glass transition temperature of 15° C.

4. 1. 6. Acrylic Resin Emulsion B-2

Styrene-acrylic resin emulsion B-2 was prepared in the same manner as in the preparation of acrylic resin emulsion B-1, except that the monomers consisting of 700 parts of methyl acrylate (MA), 100 parts of hydroxyethyl acrylate (HEA), and 50 parts of butyl acrylate (BA) were replaced with monomers consisting of 450 parts of methyl acrylate (MA), 100 parts of benzyl acrylate (BzA), 100 parts of hydroxyethyl acrylate (HEA), and 150 parts of butyl acrylate (BA). The resulting acrylic resin emulsion B-2 contained 30% of solids having an average particle size of 90 nm and had an acid value of 28 mg KOH/g and a glass transition temperature of 10° C.

4. 1. 7. Styrene-Acrylic Resin Emulsion C-1

Anionic styrene-acrylic resin emulsion C-1 was prepared in the same manner as in the preparation of acrylic resin emulsion B-1, except that the monomers consisting of 700 parts of methyl acrylate (MA), 100 parts of hydroxyethyl acrylate (HEA), and 50 parts of butyl acrylate (BA) were replaced with monomers consisting of 450 parts of methyl acrylate (MA), 100 parts of styrene (St), 100 parts of hydroxyethyl acrylate (HEA), and 150 parts of butyl acrylate (BA). The resulting styrene-acrylic resin emulsion C-1 contained 30% of solids having an average particle size of 80 nm and had an acid value of 28 mg KOH/g and a glass transition temperature of 20° C.

4. 1. 8. Styrene-Acrylic Resin Emulsion C-2

Anionic styrene-acrylic resin emulsion C-2 was prepared in the same manner as in the preparation of styrene-acrylic resin emulsion C-1, except that 48 parts of methacrylic acid (MAA) was replaced with 35 parts of acrylic acid (AA). The resulting acrylic resin emulsion C-2 contained 30% of solids having an average particle size of 90 nm and had an acid value of 28 mg KOH/g and a glass transition temperature of 20° C.

4. 2. Preparation of Cationic Resin Particles

Emulsions of some cationic resins were prepared as the dispersion of cationic resin particles.

4. 2. 1. Urethane Resin Emulsion D-1

Cationic urethane resin emulsion D-1 was prepared as the dispersion of cationic resin particles. More specifically, a reaction vessel equipped with a stirrer, a reflux condenser, a thermometer, and a dropping funnel was charged with 100 parts of a polycarbonate diol NIPPOLAN (registered trademark) 964 (number average molecular weight: 2000, produced by Tosoh Corporation) and 50 parts of a polyester produced by a reaction of neopentyl glycol, 1,4-butanediol, terephthalic acid, and adipic acid. The mixture was subjected to dehydration at 120° C. under reduced pressure of 0.1 MPa.

After the dehydrated material was cooled to 70° C., 100 parts of methyl ethyl ketone was added, followed by cooling to 50° C. and stirring for mixing. Then, 43 parts of dicyclohexylmethane 4,4'-diisocyanate (4,4'-H-MDI) and 0.3 part of a urethanation catalyst XK-64 (produced by Kusumoto Chemicals) were added. The resulting mixture was subjected to a reaction at 70° C. for 4 hours.

After the completion of the reaction, 13 parts of a tertiary amino group-containing polyol E-1, which will be described later, was added for further reaction. The reaction was conducted for 5 hours, followed by cooling to 55° C. Then, 7.2 parts of (3-aminopropyl)triethoxysilane KBE-903 produced by Shin-Etsu Chemical was added, and a reaction was conducted for 2 hours. Thus, an isocyanate-terminated urethane prepolymer solution was prepared. Then, 7 parts of norbornene diamine was added to the urethane prepolymer solution, and a chain elongating reaction was conducted for 2 hours.

Subsequently, 300 parts of methyl ethyl ketone and 3 parts of propionic acid were added to the reaction vessel. After cooling to about 20° C., 500 parts of ion-exchanged water was added for dispersion. The resulting water dispersion was subjected to vacuum distillation to partially remove methyl ethyl ketone and water. Cationic urethane resin emulsion D-1 was thus prepared. The resulting urethane resin emulsion D-1 contained 30% of solids and had a pH of 4.3. The pH was measured at 25° C. with a pH meter AS800 produced by AS ONE Corporation. The pH of the following emulsions was also measured in the same manner.

4. 2. 2. Urethane Resin Emulsion D-2

Cationic urethane resin emulsion D-2 was prepared in the same manner as in the preparation of urethane resin emulsion D-1, except that dicyclohexylmethane 4,4'-diisocyanate was replaced with 35 parts of isophorone diisocyanate. The resulting urethane resin emulsion D-2 contained 30% of solids and had a pH of 4.5.

4. 2. 3. Preparation of Tertiary Amino Group-Containing Polyol E-1

A reaction vessel equipped with a thermometer, a stirrer, a reflux condenser, and a dropping funnel was charged with 90 parts of polypropylene glycol diglycidyl ether and was then purged with nitrogen. After the contents of the reaction vessel was heated to 70° C., 58 parts of di-n-butylamine was gradually added over a period of 1 hour, and a reaction was conducted at 90° C. for 12 hours to yield tertiary amino group-containing polyol E-1.

After the completion of the reaction, it was confirmed with an FT-IR spectrophotometer Nicolet (registered trademark) iN10MX produced by Thermo-Scientific that the absorption peak around 842 $cm^{-1}$ representing the presence of epoxy group disappeared.

4. 2. 4. Preparation of Tertiary Amino Group-Containing Polyol E-2

Tertiary amino group-containing polyol E-2 was prepared in the same manner as tertiary amino group-containing polyol E-1, except that 58 parts of di-n-butylamine was replaced with 45 parts of N-butylethylamine. After the completion of the reaction, it was confirmed with an FT-IR spectrophotometer Nicolet (registered trademark) iN10MX produced by Thermo-Scientific that the absorption peak around 842 $cm^{-1}$ representing the presence of epoxy group disappeared.

4. 2. 5. Acrylic Resin Emulsion F-1

A reaction vessel equipped with a stirrer, a reflux condenser, a thermometer, and a dropping funnel was charged with 250 parts of methyl ethyl ketone. The vessel was then purged with nitrogen with stirring and heated to 80° C. Then, after a mixture of 150 parts of butyl acrylate, 100 parts of methyl methacrylate, and 180 parts of dimethylaminoethyl methacrylate was added into the reaction vessel, a mixture of 20 parts of 2,2'-azobis(2-methylbutyronitrile) produced by FUJIFILM Wako Pure Chemical and 150 parts of methyl ethyl ketone was dropped over a period of 5 hours for a reaction.

After the completion of dropping, the reaction was continued for another 3 hours and, then, a mixture of 0.8 part of t-butyl peroxy-2-ethylhexanoate PERBUTYL 0 (registered trademark) produced by NOF and 5 parts of methyl ethyl ketone, and 1000 parts of ion-exchanged water were added, followed by strong stirring. After a reaction was continued for 4 hours while being kept at a constant temperature, the solid content was adjusted to 30% by partially removing methyl ethyl ketone and water by evaporation. Thus, cationic acrylic resin emulsion F-1 was prepared.

4. 2. 6. Styrene-Acrylic Resin Emulsion G-1

Cationic styrene-acrylic resin emulsion G-1 was prepared in the same manner as in the preparation of acrylic resin emulsion F-1, except that 150 parts of butyl acrylate was replaced with 100 parts of butyl acrylate and 62 parts of styrene.

4. 3. Preparation of Dispersible Anionic Pigments

Anionic pigment dispersion liquids were prepared as the dispersion of a dispersible anionic pigment.

4. 3. 1. Preparation of Pigment Dispersion Liquid 1

The mixture of 500 g of ion-exchanged water and 15 g of carbon black was stirred in a rocking mill with 1 mm zirconia beads for 30 minutes to preliminarily wet the pigment (carbon black). Then, 4485 g of ion-exchanged water was further added, and the carbon black was dispersed in water with a high-pressure homogenizer HJP-25005 (manufactured by Sugino Machine).

The average particle size of the carbon black was 110 nm at this time. The resulting dispersion was removed into a high-pressure container. After a pressure of 3 MPa was applied to the dispersion, 100 ppm ozone water was introduced into the high-pressure container for surface treatment of the carbon black particles. Subsequently, the resulting dispersion liquid was adjusted to pH 9.0 with 0.1 mol/L sodium hydroxide aqueous solution, and the solid content of the pigment in the dispersion liquid was adjusted to yield pigment dispersion liquid 1. Pigment dispersion liquid 1 contained a self-dispersible pigment consisting of carbon black particles having surfaces to which —COONa group was bound. The carbon black content in the pigment dispersion liquid was 30%.

4. 3. 2. Preparation of Pigment Dispersion Liquid 2

A water-soluble resin was prepared by neutralizing a styrene-acrylic acid copolymer having an acid value of 100 mg KOH/g and a weight average molecular weight of 10000 with 0.1 mol/L sodium hydroxide aqueous solution. Then, a mixture of 14000 g of ion-exchanged water, 500 g of carbon black as a pigment, and 1000 g of the water-soluble resin was prepared. The constituents of the mixture were dispersed in each other for 1 hour in a rocking mill with 1 mm zirconia beads. Then, the dispersion underwent centrifugation to remove impurities, followed by filtration through a microfilter with a pore size of 5.0 μm (manufactured by Millipore) under reduced pressure. Subsequently, the solid content of the pigment was adjusted to yield anionic pigment dispersion liquid 2 having a pH of 9.0. The resulting pigment dispersion liquid 2 contained carbon black dispersed with the water-soluble resin as a resin dispersant. In pigment dispersion liquid 2, the carbon black content was 30.0%, and the resin dispersant content was 15.0%.

4. 3. 3. Preparation of Pigment Dispersion Liquid 3

A reaction vessel equipped with a stirrer, a thermometer, a reflux tube, and a dropping funnel was purged with nitrogen and then charged with 300 parts of methyl ethyl ketone, and then 40 parts of styrene, 40 parts of ethyl methacrylate, 5 parts of lauryl acrylate, 5 parts of lauryl methacrylate, 5 parts of methoxy polyethylene glycol 400 acrylate AM-90G (produced by Shin-Nakamura Chemical), 5 parts of acrylic acid, 0.2 part of ammonium persulfate, and 0.3 part of t-dodecyl mercaptan were dropped into the reaction vessel from the dropping funnel over a period of 4 hours for a polymerization reaction. Subsequently, 40 parts of methyl ethyl ketone was added into the reaction vessel to yield a resin dispersant solution.

The styrene-equivalent weight average molecular weight of the resin dispersant was determined by subjecting the resulting resin dispersant solution to gel permeation chromatography (GPC) with L7100 System (manufactured by Hitachi) using tetrahydrofuran (THF) as a solvent. The result was 58000. Also, the polydispersity (Mw/Mn) was 3.1.

Next, 40 parts of the resin dispersant solution, 30 parts of a cyan pigment CHROMOFINE BLUE C.I. Pigment Blue 15:3 produced by Dainichiseika Color & Chemicals, 100 parts of 0.1 mol/L sodium hydroxide aqueous solution, and 30 parts of methyl ethyl ketone were mixed and agitated for 8-pass dispersion with Ultimizer 25005 (manufactured by Sugino Machine). C.I. Pigment Blue 15:3 is herein also designated as PB15:3.

Subsequently, 300 parts of ion-exchanged water was added, and the entirety of methyl ethyl ketone and part of water were removed by evaporation using a rotary evaporator. The resulting dispersion liquid was adjusted to pH 9 with 0.1 mol/L sodium hydroxide solution. Then, while the volume average particles size of the cyan pigment was being measured with a particle size distribution analyzer, the dispersion liquid was dispersed until the volume average particle size of the cyan pigment was reduced to 100 nm. The resulting dispersion was filtered through a 3 μm membrane filter to yield a pigment dispersion liquid 3 containing 20% by mass of solids (the resin dispersant and the pigment).

4. 4. Preparation of Primer Ink Compositions

Primer ink compositions of Examples and Comparative Examples were presented in Table 1. After the constituents presented in Table 1 were mixed and sufficiently stirred, the mixture was subjected to vacuum filtration through a microfilter having a pore size of 5.0 μm (manufactured by Millipore). Thus, primer ink compositions of the Examples and Comparative Examples were prepared. In Table 1, the value of each resin emulsion represents the net solid content of the cationic resin particles or the like introduced from the emulsion. Hence, the ion-exchanged water content presented in the Table takes into account the amount of the ion-exchanged water contained in the resin emulsion.

TABLE 1

| Primer constituent | P1 | P2 | P3 | P4 | P5 | P6 |
|---|---|---|---|---|---|---|
| D-1 | 8.00 | — | — | — | — | — |
| D-2 | — | 8.00 | — | — | — | — |
| E-1 | — | — | 8.00 | — | — | — |
| E-2 | — | — | — | 8.00 | — | — |
| F-1 | — | — | — | — | 8.00 | — |
| G-1 | — | — | — | — | — | 8.00 |
| 1,2-HD | 4.00 | 4.00 | 4.00 | 4.00 | 4.00 | 4.00 |
| PG | 15.00 | 15.00 | 15.00 | 15.00 | 15.00 | 15.00 |
| SAG503A | 0.50 | 0.50 | 0.50 | 0.50 | 0.50 | 0.50 |
| TEA | 0.50 | 0.50 | 0.50 | 0.50 | 0.50 | 0.50 |
| EDTA | 0.02 | 0.02 | 0.02 | 0.02 | 0.02 | 0.02 |
| Ion-exchanged water | 71.98 | 71.98 | 71.98 | 71.98 | 71.98 | 71.98 |

4. 5. Preparation of Ink Jet Ink Compositions

Table 2 presents the constituents and the contents thereof in the ink jet ink compositions of the Examples and Comparative Examples. After the constituents presented in Table 2 were mixed and sufficiently stirred, the mixture was subjected to vacuum filtration through a microfilter having a pore size of 5.0 μm (manufactured by Millipore). Thus, the inks of the Examples and Comparative Examples were prepared. In Table 2, the value of each pigment dispersion liquid represents the total net solid content of the pigment and the resin dispersant introduced from the pigment dispersion liquid. Similarly, the value of each resin emulsion represents the net solid content of the anionic resin particles introduced from the resin emulsion. Hence, the ion-exchanged water content presented in the Table takes into account the amount of the ion-exchanged water contained in the pigment dispersion liquid and resin emulsion. The values presented in Tables 1 and 2 are all expressed as percent by mass, and the sign "-" without any value in the Tables implies that the composition did not contain the material.

TABLE 2

| Ink constituents | R1 | R2 | R3 | R4 | R5 | R6 | R7 | R8 |
|---|---|---|---|---|---|---|---|---|
| Pigment dispersion liquid 1 | 4.00 | — | — | 4.00 | — | — | 4.00 | — |
| Pigment dispersion liquid 2 | — | 4.00 | — | — | 4.00 | — | — | 4.00 |
| Pigment dispersion liquid 3 | — | — | 4.00 | — | — | 4.00 | — | — |
| A-1 | 4.00 | — | — | — | — | — | — | — |
| A-2 | — | 4.00 | — | — | — | — | — | — |
| A-3 | — | — | 4.00 | — | — | — | — | — |
| A-4 | — | — | — | 4.00 | — | — | — | — |
| B-1 | — | — | — | — | 4.00 | — | — | — |
| B-2 | — | — | — | — | — | 4.00 | — | — |
| C-1 | — | — | — | — | — | — | 4.00 | — |
| C-2 | — | — | — | — | — | — | — | 4.00 |
| 1,2-HD | 4.00 | 4.00 | 4.00 | 4.00 | 4.00 | 4.00 | 4.00 | 4.00 |
| PG | 15.00 | 15.00 | 15.00 | 15.00 | 15.00 | 15.00 | 15.00 | 15.00 |
| SAG503A | 0.50 | 0.50 | 0.50 | 0.50 | 0.50 | 0.50 | 0.50 | 0.50 |
| TEA | 0.50 | 0.50 | 0.50 | 0.50 | 0.50 | 0.50 | 0.50 | 0.50 |
| EDTA | 0.02 | 0.02 | 0.02 | 0.02 | 0.02 | 0.02 | 0.02 | 0.02 |
| Ion-exchanged water | 71.98 | 71.98 | 71.98 | 71.98 | 71.98 | 71.98 | 71.98 | 71.98 |

The materials indicated by abbreviations in Tables 1 and 2 are as follows:

1,2-HD: 1,2-Hexanediol (normal boiling point: 223° C.)

PG: Propylene glycol (normal boiling point: 188.2° C.)

SAG503A: SILFACE (registered trademark) SAG503A, silicone surfactant, produced by Nissin Chemical Industry TEA: Triethanolamine (normal boiling point: 208° C.)

EDTA: Disodium ethylenediaminetetraacetate 4. 6. Printing in Varying Primer-Ink Combinations Table 3 presents the combination between the primer and the ink, the printing conditions, and the evaluation results in Examples 1 to 10 and Comparative Examples 1 to 6. Table 4 presents the combination between the primer and the ink, the printing conditions, and the evaluation results in Examples 11 to 20 and Comparative Examples 7 to 12. Examples 1 to 20 may be collectively referred to as the Examples, and Comparative Examples 1 to 12 may be collectively referred to as the Comparative Examples.

TABLE 3

| | | Example | | | | | | | | | | Comparative Example | | | | | |
|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 |
| Combination | Primer | P1 | P2 | P3 | P4 | P1 | P2 | P3 | P4 | P5 | P6 | P1 | P2 | P3 | P4 | P1 | P2 |
| | Ink | R1 | R2 | R3 | R4 | R5 | R6 | R1 | R2 | R3 | R4 | R1 | R1 | R1 | R2 | R2 | R3 |
| Primer | Sc (mass %) | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | Dp (%) | 80 | 90 | 70 | 60 | 50 | 80 | 90 | 70 | 60 | 50 | 80 | 90 | 70 | 60 | 50 | 80 |
| Ink | Pa (mass %) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Sa (mass %) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Di (%) | 88 | 117 | 84 | 60 | 55 | 96 | 117 | 84 | 60 | 55 | 72 | 135 | 140 | 30 | 75 | 160 |
| Value Z | | 1.1 | 1.3 | 1.2 | 1.0 | 1.1 | 1.2 | 1.3 | 1.2 | 1.0 | 1.1 | 0.9 | 1.5 | 2.0 | 0.5 | 1.5 | 2.0 |
| Printing conditions | Plastic film | OPP | OPP | OPP | OPP | OPP | OPP | OPP | OPP | OPP | OPP | OPP | OPP | OPP | OPP | OPP | OPP |
| | Platen temperature (° C.) | 55 | 55 | 55 | 55 | 55 | 55 | 55 | 55 | 55 | 55 | 55 | 55 | 55 | 55 | 55 | 55 |
| Evaluation result | Rub resistance | A | B | A | B | B | A | B | A | B | B | C | C | B | E | C | B |
| | Gloss | A | A | A | B | A | A | A | A | B | A | C | A | B | E | A | B |
| | Printing speed | A | B | A | B | A | A | B | A | B | A | D | C | E | D | C | E |
| | Peel strength of laminate | A | A | A | B | A | A | A | A | A | A | C | B | D | E | B | D |

TABLE 4

| | | Example | | | | | | | | | | Comparative Example | | | | | |
|---|---|---|---|---|---|---|---|---|---|---|---|---|---|---|---|---|---|
| | | 11 | 12 | 13 | 14 | 15 | 16 | 17 | 18 | 19 | 20 | 7 | 8 | 9 | 10 | 11 | 12 |
| Combination | Primer | P1 | P2 | P3 | P4 | P1 | P2 | P3 | P4 | P5 | P6 | P1 | P2 | P3 | P4 | P1 | P2 |
| | Ink | R1 | R2 | R3 | R4 | R5 | R6 | R1 | R2 | R3 | R4 | R1 | R1 | R1 | R2 | R2 | R3 |
| Primer | Sc (mass %) | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 | 8.0 |
| | Dp (%) | 80 | 90 | 70 | 60 | 50 | 80 | 90 | 70 | 60 | 50 | 80 | 90 | 70 | 60 | 50 | 80 |
| Ink | Pa (mass %) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Sa (mass %) | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Di (%) | 88 | 117 | 84 | 60 | 55 | 96 | 117 | 84 | 60 | 55 | 72 | 135 | 140 | 30 | 75 | 160 |
| Value Z | | 1.1 | 1.3 | 1.2 | 1.0 | 1.1 | 1.2 | 1.3 | 1.2 | 1.0 | 1.1 | 0.9 | 1.5 | 2.0 | 0.5 | 1.5 | 2.0 |
| Printing conditions | Plastic film | PET | PET | PET | PET | PET | PET | PET | PET | PET | PET | PET | PET | PET | PET | PET | PET |
| | Platen temperature (° C.) | 55 | 55 | 55 | 55 | 55 | 55 | 55 | 55 | 55 | 55 | 55 | 55 | 55 | 55 | 55 | 55 |
| Evaluation result | Rub resistance | A | B | A | B | B | A | B | A | B | B | C | C | B | E | C | B |
| | Gloss | A | A | A | B | B | A | A | A | B | B | C | B | B | E | B | B |
| | Printing speed | A | B | A | B | A | A | B | A | B | A | D | C | E | D | C | E |
| | Peel strength of laminate | A | A | A | B | A | A | A | A | A | A | C | B | D | E | B | D |

For producing printed items of the Examples and the Comparative Examples, an ink jet printing apparatus was first prepared. More specifically, Seiko Epson Printer PX-G930, which ejects droplets from an ink jet head by piezoelectric energy, was prepared as the ink jet printing apparatus. This printer was modified so as to be able to print plastic films as a printing medium and provided with a platen heater capable of heating the platen. In order to print the primer and the ink with the respective printers, two same printers were prepared. The primers and the inks prepared above were each introduced into the ink cartridges of the printers.

The printing duty Dp of the primer presented in Tables 3 and 4 is defined such that when a solid pattern is printed under the condition where a primer droplet of 28 ng±10% is applied onto a unit region of 1/600 inch×1/600 inch, the printing duty is 100%. With respect to this, printing was performed at varying primer printing duties Dp.

Also, the printing duty Di of the ink is defined such that when a solid pattern is printed under the condition where an ink droplet of 28 ng±10% is applied onto a unit region of 1/600 inch×1/600 inch, the printing duty is 100%. With respect to this, printing was performed at varying ink printing duties Di.

The printing in the Examples and the Comparative Examples was performed at a temperature of 23° C. and a relative humidity of 55%. The platen temperatures for printing the primer and the ink were both 55° C. In the Examples and the comparative Examples in Table 3, a biaxially oriented polypropylene (OPP) film FOS-AQ (thickness: 60 μm) manufactured by Futamura Chemical was used as the plastic film as the non-absorbent printing medium. In the Examples and the comparative Examples in Table 4, a polyethylene terephthalate (PET) film FE2001 (thickness: 50 μm) manufactured by Futamura Chemical was used as the plastic film as the non-absorbent printing medium.

The materials indicated by abbreviations in Tables 3 and 4 are as follows:

Sc: Solid content (mass %) of cationic resin particles in the primer

Dp: Printing duty (%) of the primer

Pa: Solid content (mass %) of dispersible anionic pigment in the ink

Sa: Solid content (mass %) of anionic resin particles in the ink

Di: Printing duty (%) of the ink

Printed items of the Examples and the Comparative Examples were produced under the conditions described above and with varying value Z, which is calculated from equation (1). The resulting printed items were evaluated as described below and the results are presented in Tables 3 and 4. The primer and the ink were printed on the printing medium in this order.

4. 7. Examination 4. 7. 1. Rub Resistance

The resulting printed items were subjected to rubbing test with a Gakushin-type rubbing tester AB-301 (manufacture by Tester Sangyo. More specifically, the printed items were dried at 70° C. for 1 minute. Then, the printed items were subjected to dry rubbing test at a load of 200 g reciprocally 100 times and wet rubbing test at a load of 200 g reciprocally 10 times. The degree of peeling of the rubbed printed times was visually rated according to the following criteria. The samples rated as A or B were determined to be acceptable.

A: In both the dry rubbing and the wet rubbing, no peeling occurred.

B: In both the dry rubbing and the wet rubbing, peeling occurred in less than 1%.

C: In both the dry rubbing and the wet rubbing, peeling occurred in 1% to less than 5%.

D: In both the dry rubbing and the wet rubbing, peeling occurred in 5% to less than 10.

E: In both the dry rubbing and the wet rubbing, Peeling occurred in 10% or more.

4. 7. 2. Gloss

The gloss of the printed items was measured at an angle of 20° with a glossmeter. A handy glossmeter MULTI GLOSS 268 manufactured by Konica Minolta was used as the glossmeter. The measurements of 20° gloss were rated according to the following criteria:

A: 20° gloss on the plastic film was 65 or more.

B: 20° gloss on the plastic film was 60 to less than 65.

C: 20° gloss on the plastic film was 55 to less than 60.

D: 20° gloss on the plastic film was 50 to less than 55.

E: 20° gloss on the plastic film was less than 50.

4. 7. 3. Printing Speed

In order to determine whether or not the printing speed could be increased, high-speed printing was performed. More specifically, immediately after printing, the printed item was covered with a PPC sheet, and a load of 20 g/cm$^2$ was applied to the printed item. After the printed item in such a state was allowed to stand for 10 minutes, the PPC sheet was removed. The degree of the ink transferred to the PPC sheet was visually observed. The degree of ink transfer was rated according to the following criteria. The more rapidly, the ink and the primer dried, the lower the degree of ink transfer. Hence, the lower the degree of ink transfer, the more suitable for high speed printing the combination of the ink and the primer is. The combinations rated as A or B are determined to be acceptable.

A: No transfer to the PPC sheet was seen.

B: Transfer to the sheet was hardly seen.

C: A little transfer to the PPC sheet was seen.

D: Clear transfer to the PPC sheet was seen.

E: A considerable amount of transfer to the PPC sheet was seen.

4. 7. 4. Peel Strength of Laminate

The printed item was subjected to lamination, and the adhesion between the printed item and the lamination material was estimated by measuring the peel strength of the laminate. More specifically, the printed items were dried at 70° C. for 1 minute and then allowed in a room at about 20° C. over night. Then, the printed items were laminated according to the following procedure in accordance with JIS Z0237.

A mixture of the components TM329 and CAT8B of a two-component dry lamination adhesive produced by Toyo-Morton was applied onto the printed item to a thickness of 2 μm to 3 μm with a No. 2 bar coater. After the applied adhesive was dried, the printed item was laminated with a polyethylene sealant PE TUX-HCE (thickness: 60 μm) produced by Mitsui Chemicals Tohcello. The resulting laminate was pressed at 0.05 MPa with Pneumatic Mangle manufactured by Tsujii Senki Kogyo while transporting the laminate at a speed of 1 m/min. Then, the laminates were maturated at 40° C. for 24 hours to yield sample laminates for the peel strength test.

The samples were cut to a width of 15 mm, and the peel strength was measured with a tensile tester TENSILON (registered trademark) RTG 1250 manufactured by A&D. More specifically, the sample was folded back 180° as specified in JIS 20237 to separate the polyethylene sealant used as the lamination material 25 mm from the plastic film. The peeled portions of the plastic film and the lamination material were individually fixed to the upper and lower chucks of a 50 N load cell. The plastic film and the lamination material were thus pulled at a tester speed of 5 mm/s, and the peel strength was measured three times between a point of 25 mm peeled and a point of 50 mm peeled, neglecting the measurement up to 25 mm from the beginning of pulling. The largest peel strengths (N/15 mm) of the measurements were averaged, and the average peel strength was rated according to the following criteria:

A: 5 N/15 mm or more

B: 2.5 N/15 mm to less than 5 N/15 mm

C: 1 N/15 mm to less than 2.5 N/15 mm

D: 0.5 N/15 mm to less than 1 N/15 mm

E: less than 0.5 N/15 mm 4. 7. 5. Evaluation Results

Tables 3 and 4 show that the rub resistance and the printing speed were evaluated as A or B in all Examples 1 to 20. These results suggest that the ink-primer combinations of the Examples allow high-speed printing and provide high rub resistance. Also, all Examples 1 to 20 evaluated as A or B in gloss and peel strength of the laminate, suggesting that the combinations of the Examples can improve such properties.

On the other hand, all Comparative Examples 1 to 12 were rated to be C or inferior in rub resistance, thus evaluated as not acceptable. Also, the printing speed of the Comparative Examples except Comparative Examples 3, 6, 9, and 12 was rated to be C or worse and evaluated as not acceptable. For Comparative Examples 3, 6, 9, and 12, the printing speed was not evaluated as A. Thus, it is suggested that the combinations of the Comparative Examples cannot provide both high rub resistance and high printing speed together. Furthermore, in Comparative Examples 1, 3, 4, 6, 7, 9, 10, and 12 of the Comparative Examples, at least either the gloss or the laminate peel strength was rated to be C or worse, suggesting that the combinations of these Comparative Examples are not likely to improve such properties.

The following are derived from the embodiments of the present disclosure.

The ink jet printing method according to the present disclosure uses a primer ink composition containing cationic resin particles and water and an ink jet ink composition containing a dispersible anionic pigment, anionic resin particles, and water. The method includes applying these ink compositions onto a printing medium such that a value Z define by the following equation (1) is in the range of 1.0 to 1.3:

$$Z=\{(Pa+Sa)\times Di\}/(Sc\times Dp) \qquad (1),$$

wherein Sc represents the solid content of the cationic resin particles in the primer ink composition, represented by percentage to the total mass of the primer ink composition, Pa represents the solid content of the dispersible anionic pigment in the ink jet ink composition, represented by percentage to the total mass of the ink jet ink composition, Sa represents the solid content of the anionic resin particles in the ink jet ink composition, represented by percentage to the total mass of the ink jet ink composition, Dp represents the printing duty of the primer ink composition applied onto the printing medium, represented by percentage, and Di represents the printing duty of the ink jet ink composition applied onto the printing medium, represented by percentage.

The embodiments of the present disclosure can increase the resistance to rubbing of the ink jet ink composition applied onto non-absorbent printing media and printing speed compared to the known art. When value Z is 1.0 or more, the dispersible anionic pigment and the anionic resin particles aggregate easily with the cationic resin particles on the printing medium. Consequently, the dispersible anionic pigment is likely to be surrounded by the anionic resin particles and the cationic resin particles. Such dispersible anionic pigment is unlikely to fall or separate from the printing medium, accordingly, increasing resistance to rubbing (hereinafter often referred to as rub resistance).

When value Z is 1.3 or less, the proportion of the dispersible anionic pigment and the anionic resin particles to the cationic resin particles is not likely to be excessive and, therefore, the dispersible anionic pigment particles can aggregate reliably. Accordingly, even if a non-absorbent or poorly absorbent printing medium is printed at a higher speed than in the known printing method, color mixing and a coffee ring phenomenon can be suppressed. Thus, the embodiments according to the present disclosure can provide an ink jet printing method capable of high-speed printing and forming ink coatings having a high resistance to rubbing.

In the ink jet printing method disclosed herein, the printing medium may be a plastic film.

Plastic films facilitate a uniform aggregation of the solid particles in the ink jet ink composition and the primer ink composition compared to absorbent printing media. Accordingly, the ink jet ink composition is not likely to form a coating in which the dispersible anionic pigment particles are unevenly distributed, thus helping increase resistance to rubbing.

In the ink jet printing method, the anionic resin particles may contain at least one of urethane resin, acrylic resin, and styrene-acrylic resin.

Such anionic resin particles increases the adhesion of the ink jet ink composition to the printing medium. Accordingly, the ink jet ink composition can form coatings resistant to rubbing. In addition, the gloss of the printed item produced by the ink jet printing method is increased.

In the ink jet printing method, an ink jet head may apply the ink jet ink composition onto the printing medium.

The use of an ink jet head facilitates the control of the application amount of the ink jet ink composition.

In the ink jet printing method, an ink jet head may apply the primer ink composition onto the printing medium.

The use of an ink jet head facilitates the control of the application amount of the primer ink composition. The ink jet printing method can be easily applied to high-mix low-volume printing. The ink jet printing method does not use any printing plate, unlike gravure printing or offset printing.

A primer ink composition according an embodiment of the present disclosure is used in the above-described ink jet printing method.

The primer ink composition can form coatings resistant to rubbing on a non-absorbent printing medium and can be rapidly printed on the non-absorbent printing medium.

An ink jet ink composition according to an embodiment of the present disclosure is used in the above-described ink jet printing method.

The ink jet ink composition can form coatings resistant to rubbing on a non-absorbent printing medium and can be rapidly printed on the non-absorbent printing medium.

What is claimed is:

1. An ink jet printing method comprising:
applying a primer ink composition containing cationic resin particles and water and an ink jet ink composition containing 0.1 to 4.0% by weight of a dispersible anionic pigment, anionic resin particles, and water onto a printing medium such that a value Z defined by the following equation is in the range of 1.0 to 1.3:

$Z=\{(Pa+Sa) \times Di\}/(Sc \times Dp)$, wherein
Sc represents the solid content of the cationic resin particles in the primer ink composition, represented by percentage to the total mass of the primer ink composition,
Pa represents the solid content of the dispersible anionic pigment in the ink jet ink composition, represented by percentage to the total mass of the ink jet ink composition,
Sa represents the solid content of the anionic resin particles in the ink jet ink composition, represented by percentage to the total mass of the ink jet ink composition,
Dp represents the printing duty of the primer ink composition applied onto the printing medium, represented by percentage, and
Di represents the printing duty of the ink jet ink composition applied onto the printing medium, represented by percentage.

2. The ink jet printing method according to claim 1, wherein
the printing medium is a polymer film.

3. The ink jet printing method according to claim 1, wherein
the anionic resin particles contain at least one of urethane resin, acrylic resin, and styrene-acrylic resin.

4. The ink jet printing method according to claim 1, wherein
the ink jet ink composition is applied from an ink jet head onto the printing medium.

5. The ink jet printing method according to claim 1, wherein
the primer ink composition is applied from an ink jet head onto the printing medium.

6. A primer ink composition used in the ink jet printing method as set forth in claim 1.

7. An ink jet ink composition used in the ink jet printing method as set forth in claim 1.

* * * * *